(12) United States Patent
Uemura et al.

(10) Patent No.: US 7,197,240 B2
(45) Date of Patent: Mar. 27, 2007

(54) CAMERA MODULE AND PORTABLE TERMINAL EQUIPPED WITH THE CAMERA MODULE

(75) Inventors: Kouhei Uemura, Kawasaki (JP); Katsumi Tsuji, Yokohama (JP)

(73) Assignee: Kyocera Corporation, Kyoto (JP)

( * ) Notice: Subject to any disclaimer, the term of this patent is extended or adjusted under 35 U.S.C. 154(b) by 221 days.

(21) Appl. No.: 11/023,280

(22) Filed: Dec. 27, 2004

(65) Prior Publication Data
US 2005/0169622 A1 Aug. 4, 2005

(30) Foreign Application Priority Data

| Dec. 26, 2003 | (JP) | ............................. 2003-435553 |
| Dec. 26, 2003 | (JP) | ............................. 2003-435744 |
| Jan. 30, 2004 | (JP) | ............................. 2004-024610 |

(51) Int. Cl.
G03B 17/12 (2006.01)
G02B 15/14 (2006.01)
H04N 5/225 (2006.01)

(52) U.S. Cl. .................. 396/72; 359/696; 348/374
(58) Field of Classification Search ................ 396/72, 396/79, 83, 85; 359/676, 694, 696, 699; 348/240.3, 335, 340, 345, 357, 373–375
See application file for complete search history.

(56) References Cited

FOREIGN PATENT DOCUMENTS

| JP | 02-1710 | 1/1990 |
| JP | 03-206700 | 9/1991 |
| JP | 07-063970 | 3/1995 |
| JP | 09-35312 | 2/1997 |
| JP | 10-062852 | 3/1998 |
| JP | 11-132297 | 5/1999 |
| JP | 11-305104 | 11/1999 |
| JP | 2001-245186 | 9/2001 |
| JP | 2002-182273 | 6/2002 |
| JP | 2003-262776 | 9/2003 |

Primary Examiner—W. B. Perkey
Assistant Examiner—Rishi S. Suthar
(74) Attorney, Agent, or Firm—Hogan & Hartson LLP

(57) ABSTRACT

The casing of the camera module is composed of two housings. The first housing has a base part provided with an opening for attaching a object side fixed lens and a first and second side walls extending from the base part, large cutout openings being formed between the side walls. Moving lens holders are inserted from the open side facing the base part of the first housing to be assembled to the first housing. A driving motor is bonded to a side wall of the second housing. After the first housing to which the lens moving mechanism, etc. are assembled and the second housing to which the driving motor is fixed, adjustment the lens moving mechanism, etc. can be done easily. The first and second housing are joined together with a single bolt and a single joining part joining by means of an adhesive agent. The camera module can be constructed small in size and light in weight, and a user-friendly portable terminal equipped with the camera module having autofocusing and zooming function can be provided.

15 Claims, 15 Drawing Sheets

CAMERA MODULE AND PORTABLE TERMINAL EQUIPPED WITH THE CAMERA MODULE

BACKGROUND OF THE INVENTION

1. Field of the Invention

The present invention relates to a camera module and a portable terminal provided with the camera module.

2. Description of the Related Art

A camera module having the function of autofocusing (AF) and/or zooming used for a portable terminal such as a mobile telephone is required to be constructed small in size.

When a camera module having an autofocusing (AF) function or zooming function is reduced in size, zoom lenses also must be downsized. However, the zoom lenses must me moved in the direction of the optical axis of the lenses in order to change the focal distance thereof. Therefore, it is necessary to downsize the lenses, to secure as long traveling distance of lenses as possible in a small space, and to downsize lens holders for retaining lenses, moving mechanism or driving mechanism thereof. A variety of devisal are required to downsize the camera module while keeping easiness of assembling and adjusting.

As a prior art concerning a camera module like this, there is disclosed a camera for example in JP 10-628652 (hereafter referred to as patent literature 1). In the literature 1, a driving mechanism of camera is shown which is provided with a motor which serves both for film feeding and autofocusing and a motor for zooming in order to perform the driving for autfocusing and the driving for feeding film in the opposite direction by a single driving motor with a simple construction constructed at a low cost, in which the transmission of the driving force of the motor serving both for film feeding and autofocusing is switched by means of planetary gear type clutches in the state of film winding and film feeding and in the state of film rewinding, and in which a gear for autufocus-driving is located where it can mesh with one or other of the planetary gear drives of the planetary gear type clutches, the position of one of the planetary gear is retained in the state it meshes with the gear for autofocus-driving with the limiting member and the limiting member being driven by the projecting and subtracting action of the zooming system in order to allow the limiting member to retain the driving system in the state autofocus-driving is possible. Further, in JP 7-63970 (hereafter referred to as patent literature 2) is disclosed a camera in which a cylindrical cam located at the side of the optical lens system thereof is driven by a motor to move a lens holder for zooming and a lens holder for focusing.

In Japanese Laid-Open Utility Model Application No. 2-1710 (hereafter referred to as patent literature 3) is disclosed a lens attaching structure in which the lens holder is provided with a reference surface to which an end face of the lens in the optical direction, a concaved portion is provided on the reference surface outer side of the periphery of the lens, and the lens is fixed by filling an adhesive agent in the concaved portion.

Further, as the downsizing of camera module for a portable terminal advances, the driving motor becomes small and the attaching of the motor becomes difficult as mentioned before. To resolve the problem, a composition is known in which a cylindrical step motor is located effectively in an lens-barrel to reduce the thickness of the lens-barrel and the lenses can be driven accurately and at high speed (hereafter referred to as prior art 1). According to this prior art, the front lens group is located fixedly in the front side of the aperture position in the lens-barrel, the rear lens group is formed to have its lower part removed, a shutter consisting of two blades which are driven to open and shut in a range not to interfere with the removed portion, the shutter serving both as the aperture, and the cylindrical step motor is located astride of the aperture position in the space below the rear lens group and front lens group.

Further, a composition is known in which, in order to construct a camera module to be thin and furthermore to realize accurate focusing and image zooming by moving lens position, lenses are fixed to the first and second barrel so that the lenses for focusing an image to an image pickup device do not deviate, further the first and second barrel are fixed to the housing, a guide groove is formed on one side of the housing to receive the extended part of the first and second housing so that the first and second housing can be slid (hereafter referred to as prior art 2) In the prior art 2, the rotation of the gear connected to the rotation shaft of the motor is converted to vertical and horizontal motion and the distance between the first barrel and the second barrel is adjusted.

Further, there are known camera modules; one in which the casing of the camera module is formed into a box having one of the side walls opened and at least moving lenses among the zoom lenses can be assembled from the opening (hereafter referred to as prior art 3); one in which a supporting part of the guide of lens frames is provided in a housing retaining an object side lens and lens frames for zooming and focusing are driven by means of two lead screws to utilize the space of lens barrel efficiently (hereafter referred to prior art 4); one in which are provided a lead screw for zooming in the first quadrant around the optical axis, a lead screw for focusing in the second quadrant, and a guide shaft for guiding lens frames to compose the lens barrel in small size (hereafter referred to prior art 5); and one in which an object side lens is retained in a upper housing, lens frames for zooming and focusing are driven by two lead screws respectively, bearings for the two lead screws and two guide shafts of the lens frames are provided in the upper housing, and CCD is attached to the lower housing (hereafter referred to prior art 6).

Further, as a camera module, there are known one which is downsized by locating a lead screw for autofocusing and a lead screw for zooming on one side of the case and making it possible to assemble lenses from one side of the lens barrel of the camera module (hereafter referred to prior art 7), and one in which switching between telephotographing and macro-photographing in pan-focus lenses is done by means of a cylindrical cam located in the vicinity of lens frames (hereafter referred to prior art 8).

However, the apparatus recited in patent literature 1 relates to a relatively large camera module for a video camera and consideration is not taken into for downsizing the camera module as is in the case of a camera module to be equipped to a portable terminal. The apparatus disclosed in patent literature 2 is a small sided camera module to be incorporated in a portable terminal, etc., but it is of mutual operation type and can not be applied to a camera module in which zooming and autofocusing are performed by means of a motor. Further, the structure disclosed in patent literature 3 teaches simply a method of fixing lenses and there is no description concerning the method of assembling the lenses, a lens moving mechanism including cam, motor, and gears composing a camera module.

SUMMARY OF THE INVENTION

The object of the present invention is to provide a camera module constructed such that a sufficient distance of lens movement is secured in a small space even if the function of autofocusing (AF) and/or zooming is incorporated and a portable terminal equipped with the camera module.

To achieve the object mentioned above, the present invention proposes a camera module comprising: a first housing with at least one side opened, guide shafts and shafts possible to be inserted from said open side and the end of each of which is attached to a first positioning part of said first housing defined on the face opposite to said open side, gears possible to be fitted rotatably to said shafts, a cylindrical cam possible to be mounted to a first supporting part defined on the face opposite to said open side and driven via said gears, a motor for driving said cylindrical cam via said gears for focal and/or image magnification adjustment, moving lenses possible to be inserted from said open side and located to be moved along said guide shafts as said cylindrical cam is rotated, and a second housing possible to be joined to said first housing from said open side and having a second positioning part for retaining said motor defined therein.

Said first housing has a cutout opening part from which said optical system can be adjusted after assembling, and a light shielding member to cover the opening part are provided.

Said first supporting part for positioning said guide shafts and a second supporting part for positioning said shafts are defined on the face opposite to said open side.

Further, said second housing has a second opening part formed to face the peripheral surface of said motor, and an adhesive agent exists on the inside surfaces of both fringe parts of said second opening part to fix said motor to said second housing when said motor is positioned at said second positioning part.

Said second housing retain the motor in the vicinity of the cylindrical cam. The width of said second opening part is smaller than the diameter of said motor, and said fringe parts of said second opening part where said motor contacts is shaped into the same shape as the peripheral surface of said motor.

Said second housing has side wall parts of small thickness extending from both ends of said second opening part, and a light shielding member is positioned on said thin wall part and covers said second opening part.

Further, the depth of the casing of the camera module consisting of said first and second housing in a plane perpendicular to the optical direction is about the same as the sum of the diameter of said cylindrical cam and the diameter of said motor.

In the present invention, the camera module having accommodated in the casing thereof an optical lens system and a lens moving mechanism for moving a part of the lenses of the optical lens system to perform focal adjustment and/or image magnification change, is composed such that; the casing is composed of a plurality of housings, the optical lens system and a lens moving mechanism are contained in one of the housing, and reference surfaces for attaching a fixed lens of the optical lens system and reference surfaces for automatic assembling the lens moving mechanism are provided to the housing to face to the same direction so that other lenses of the optical lens system and the lens moving mechanism can be assembled to the housing from the side opposite to the reference surfaces.

Said first housing has reference surfaces for positioning and retaining the fixed lens of said optical lens system and reference surfaces for automatic assembling, said guide shaft attaching part and said cylindrical cam bearing part are formed in one piece with said first housing, and said reference surfaces for attaching said fixed lens and said reference surfaces for automatic assembling face to the same direction and said reference surfaces for assembling are located distantly from said reference surfaces for lens.

Said reference surfaces for positioning the fixed lens are provided on the annular formation protruding from the inner surface of the opening for retaining the fixed lens.

Said annular formation has at least three protrusions protruding inwardly at a certain angle spacing and said reference surfaces for positioning the fixed lens are provided on the surfaces of said protrusions.

Attaching part of the shafts for fitting gears to drive said cylindrical cam for rotation is formed in one piece with the first housing and said reference surfaces for automatic assembling are located at positions remote from said attaching part.

Further, the camera module having accommodated in the casing thereof an optical lens system, an image pickup device, and a lens moving mechanism for moving a part of the lenses of the optical lens system to perform focal adjustment and/or image magnification change, is composed such that; the casing is composed of a first housing for containing the optical lens system and the lens moving mechanism and a second housing for retaining the image pickup device, and the first and second housing are joined and fixed with a bolt at a bolt attaching part located near a corner part of the first housing and with an adhesive agent at a joining part provided at a corner portion located diagonally opposite to the bolt attaching part in relation to the center of the first housing.

The camera module according to the present invention comprises: an optical lens system and an image pickup device, a lens moving mechanism for moving a plurality of lenses of the optical lens system in a predetermined direction for focal and/or image magnification adjustment, a first and a second housing composing the casing of the camera module, a lens retaining part formed in one piece with said first housing for at least a lens of said optical lens system, a mounting part formed in said second housing for mounting said image pickup device, a bolt attaching part provided at a corner part of said first housing, a bolt receiving part provided to said second housing for providing a screw hole to correspond to said bolt attaching part of said first housing, a first joining part provided at the part nearly diagonally opposed to said bolt attaching part in relation to the center of said first housing, a second joining part provided to said second housing to correspond to said first joining part of said first housing, and concaved parts each provided in the vicinity of said first joining part and second joining part of said first housing and/or said second housing to form a well for retaining an adhesive agent.

Said bolt holding part of said first housing is provided to a part suitable to be thickened, and said second joining part of said second housing is provided to a part formed thin.

The camera module further comprises: lens holder or holders for retaining moving lenses, a cylindrical cam composing a lens moving mechanism for moving said lens holder or holders, guide shafts for guiding said lens holder or holders; and said cylindrical cam, said guide shafts, said first and second joining parts are located in the vicinity of the periphery of said lens holder or holders.

The camera module further comprises a driving source for driving the cylindrical cam located in the vicinity of said lens holder or holders, and said bolt attaching part is provided at a position proximate said driving source or said cylindrical cam and remote from said lens holder or holders.

Said cylindrical cam and said guide shafts are located in the vicinity of the periphery of said lens holder or holders, said driving source to drive said cylindrical cam is located near the marginal part of said first housing, and gears are incorporated between said driving source and said cylindrical cam for transmitting the driving force of said driving source.

Said first housing is formed to be open toward one side and has a thick side wall of lens retaining side and cutout opening parts, said second housing is formed such that the side wall provided with said bolt receiving part is thick and the side wall provided with said second joining part is thin, and said thick side wall part of said first housing and said thick wall part of said second housing are located such that they are positioned nearly diagonally opposite to each other.

Further, a concaved part is provided at the first joining part of said first housing to form a well for retaining an adhesive agent to bond the board mounted with said image pickup device when the second joining part of said second housing is joined to said first joining part of said first housing.

It is preferable that said first housing is formed of resin containing fluorine.

The present invention proposes a portable terminal comprising: a camera module which includes; a first housing at least one side is opened, guide shafts and shafts possible to be inserted from said open side and the end of each of which is attached to a first positioning part of said first housing defined on the face opposite to said open side, gears possible to be fitted rotatably to said shafts, a cylindrical cam possible to be mounted to a first supporting part defined on the face opposite to said open side and driven via said gears, a motor for driving said cylindrical cam via said gears for focal and/or image magnification adjustment, moving lenses possible to be inserted from said open side and located to be moved along said guide shafts as said cylindrical cam is rotated, a second housing possible to be joined to said first housing from said open side and having a second positioning part for retaining said motor defined therein; a case body equipped with said camera module; and an operation portion provided to said case body for driving said optical lens system of said camera module.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
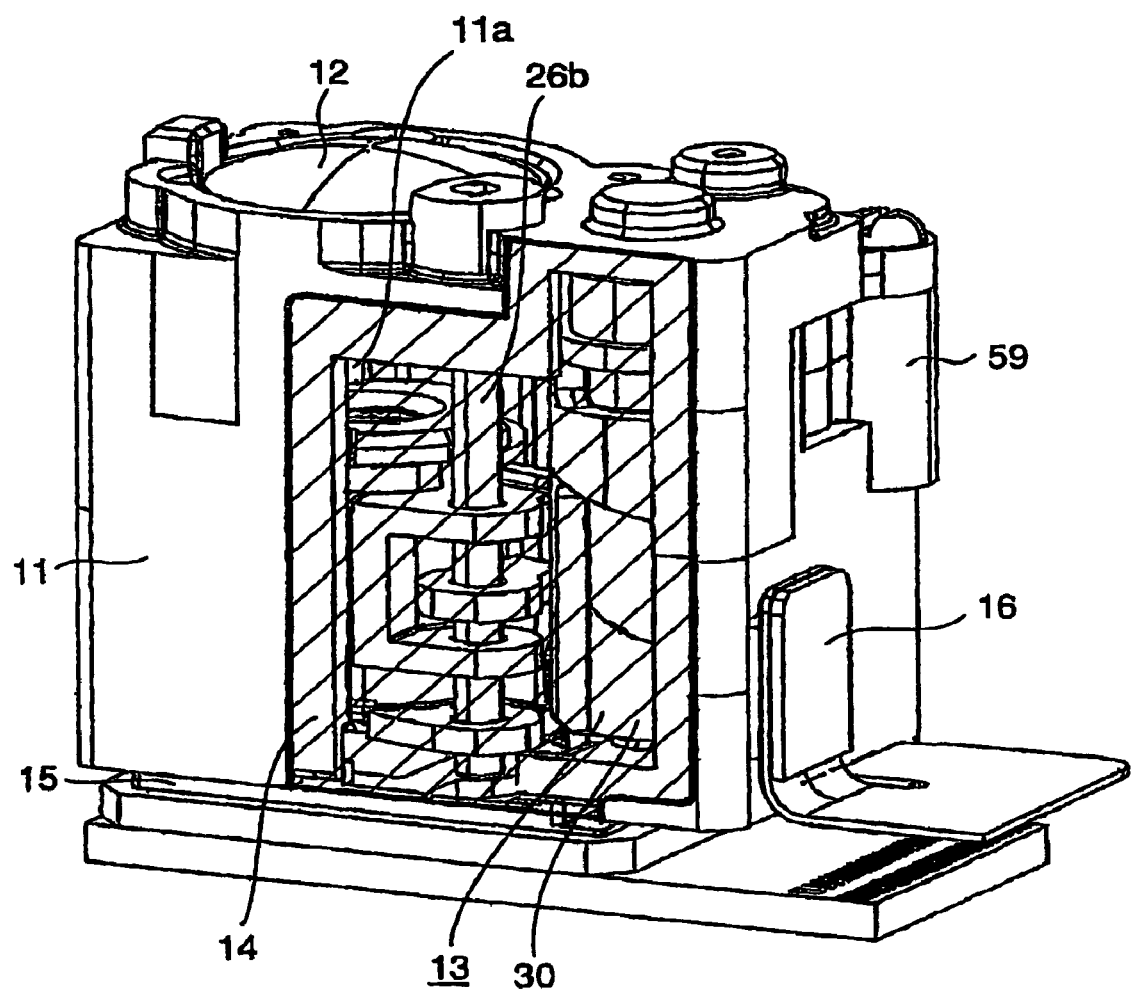
FIG. 1 is a perspective view of an embodiment of the camera module according to the present invention.
Figure 2:
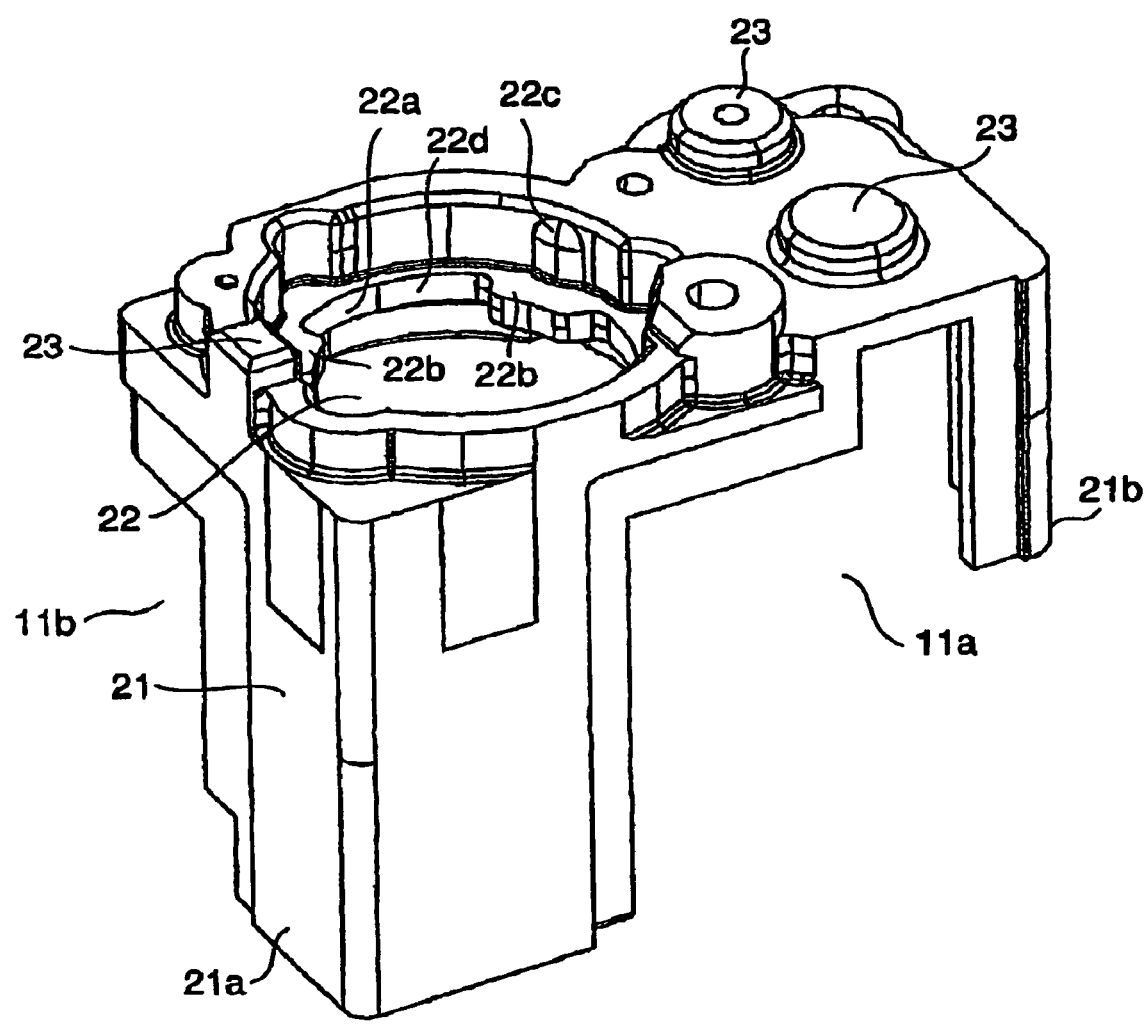
FIG. 2 is a perspective view of the first housing of the casing of the embodiment of the camera module according to the present invention.
Figure 3:
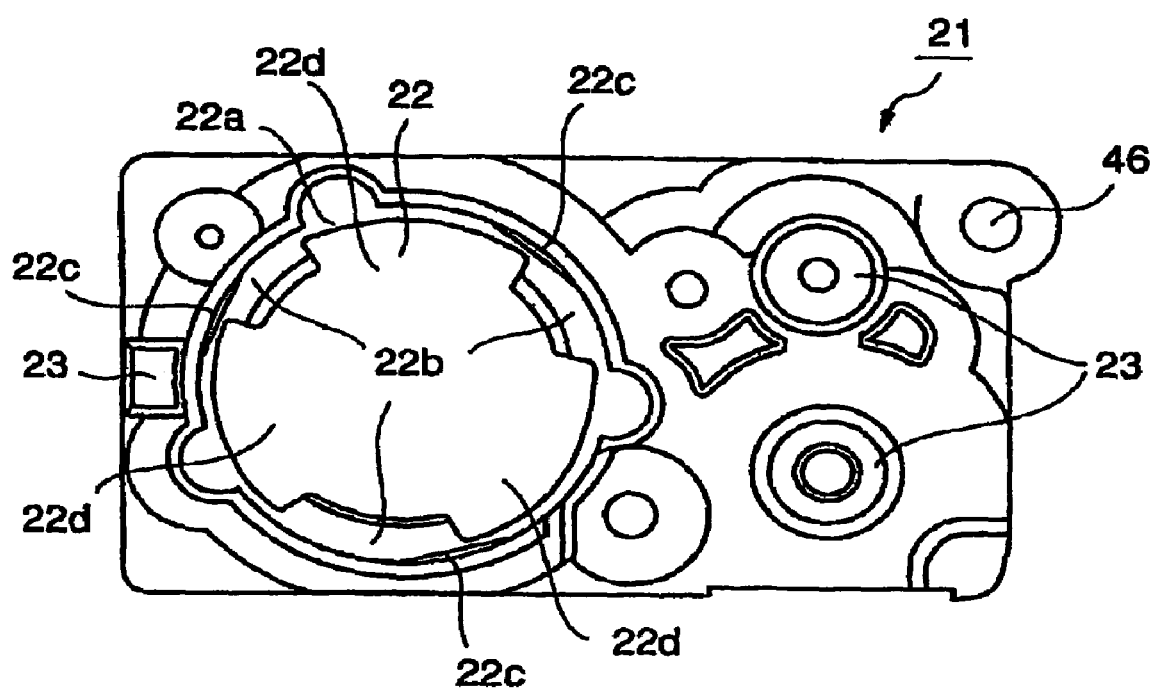
FIG. 3 is a plan view of the first housing of FIG. 2.
Figure 4:
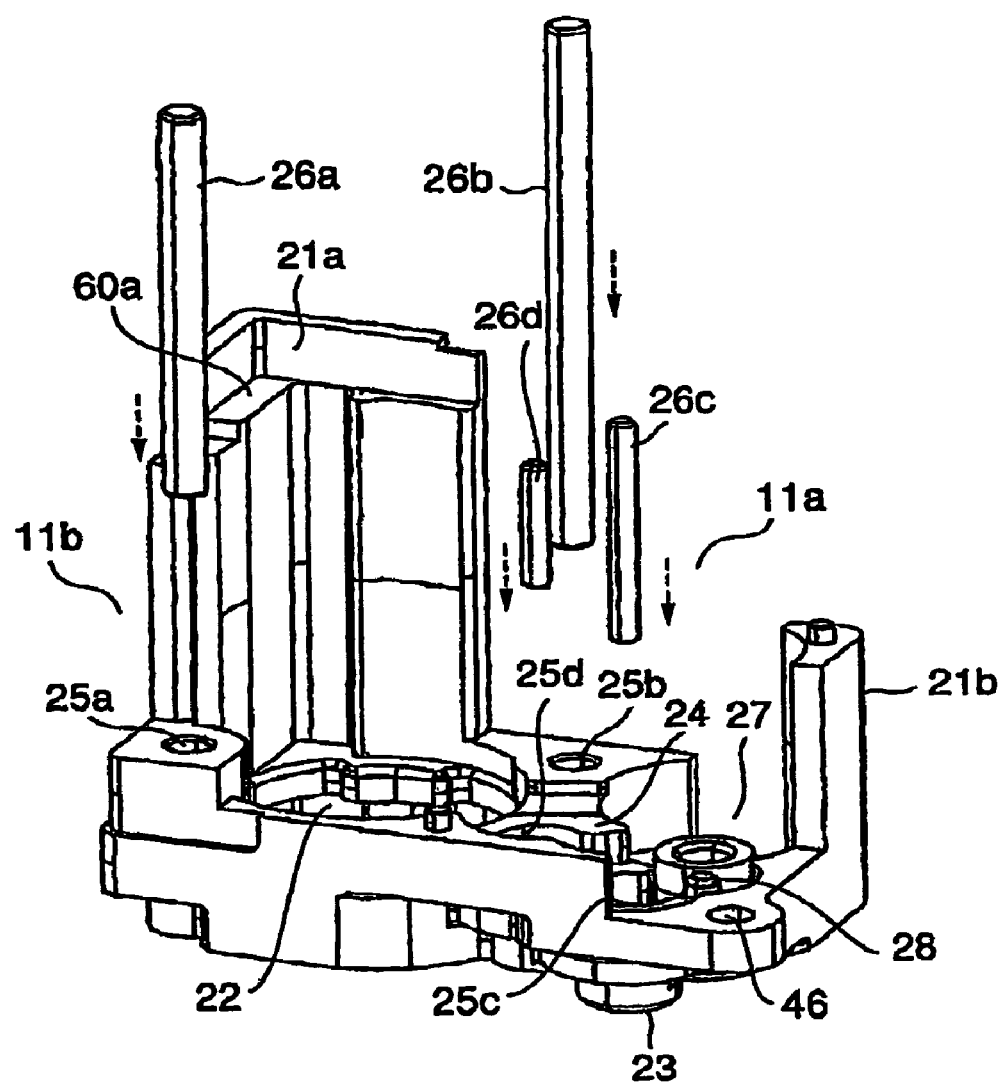
FIG. 4 is a perspective view showing the state when guide shafts and gear shafts are being attached to the first housing of FIG. 2.
Figure 5:
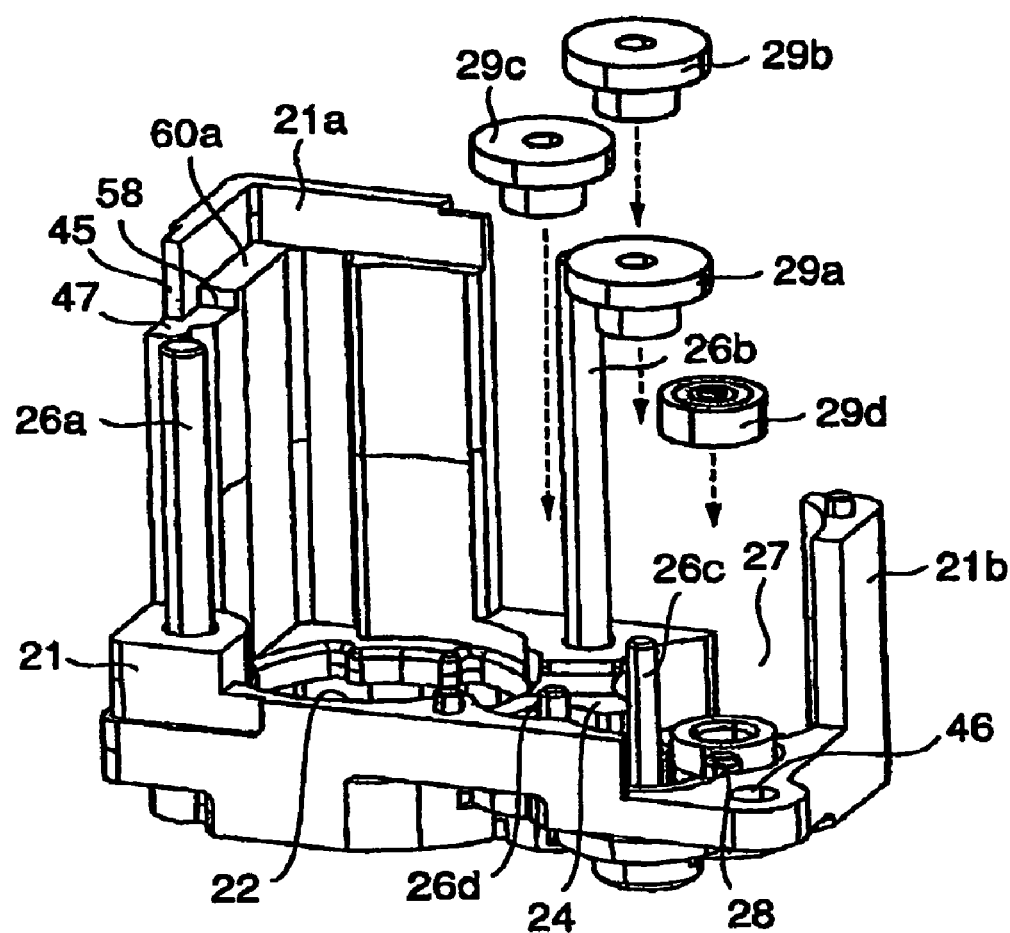
FIG. 5 is a perspective view showing the state when gears are being fitted rotatably to the gear shafts shown in FIG. 4.
Figure 6:
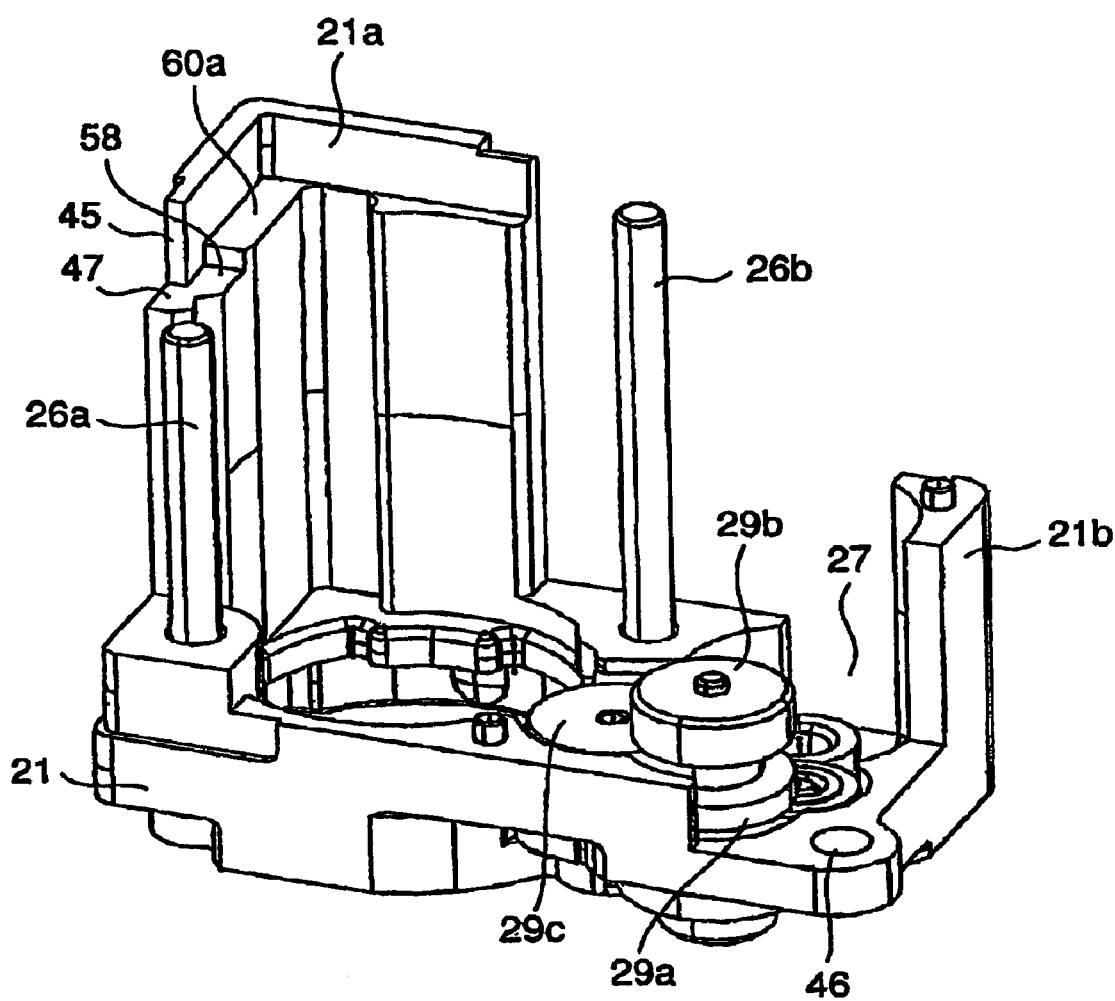
FIG. 6 is a perspective view showing the state when gears have been fitted rotatably to the gear shafts shown in FIG. 4.
Figure 7:
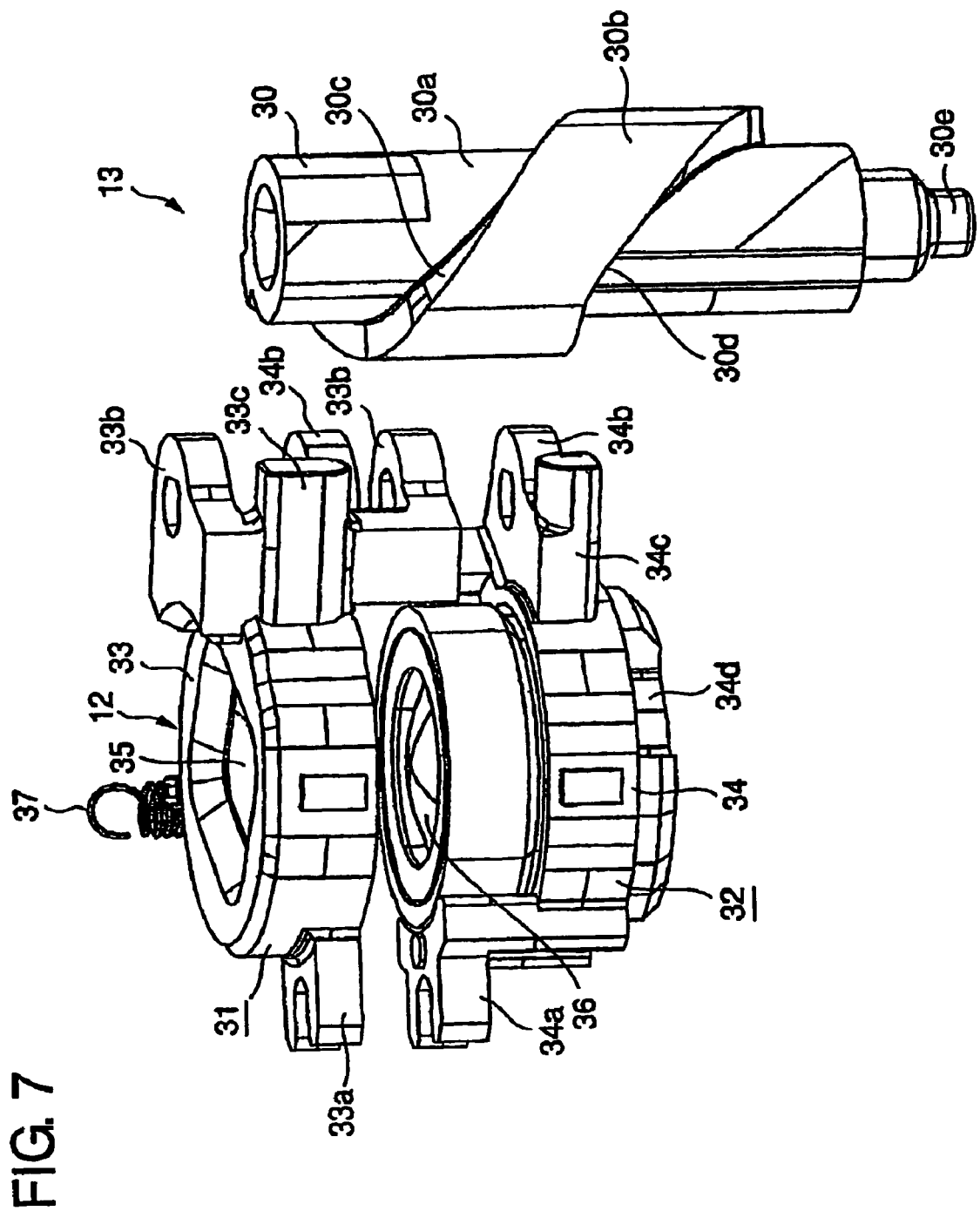
FIG. 7 is a perspective view of moving the lens assemblies and cylindrical cam of the camera module according to the present invention.
Figure 8:
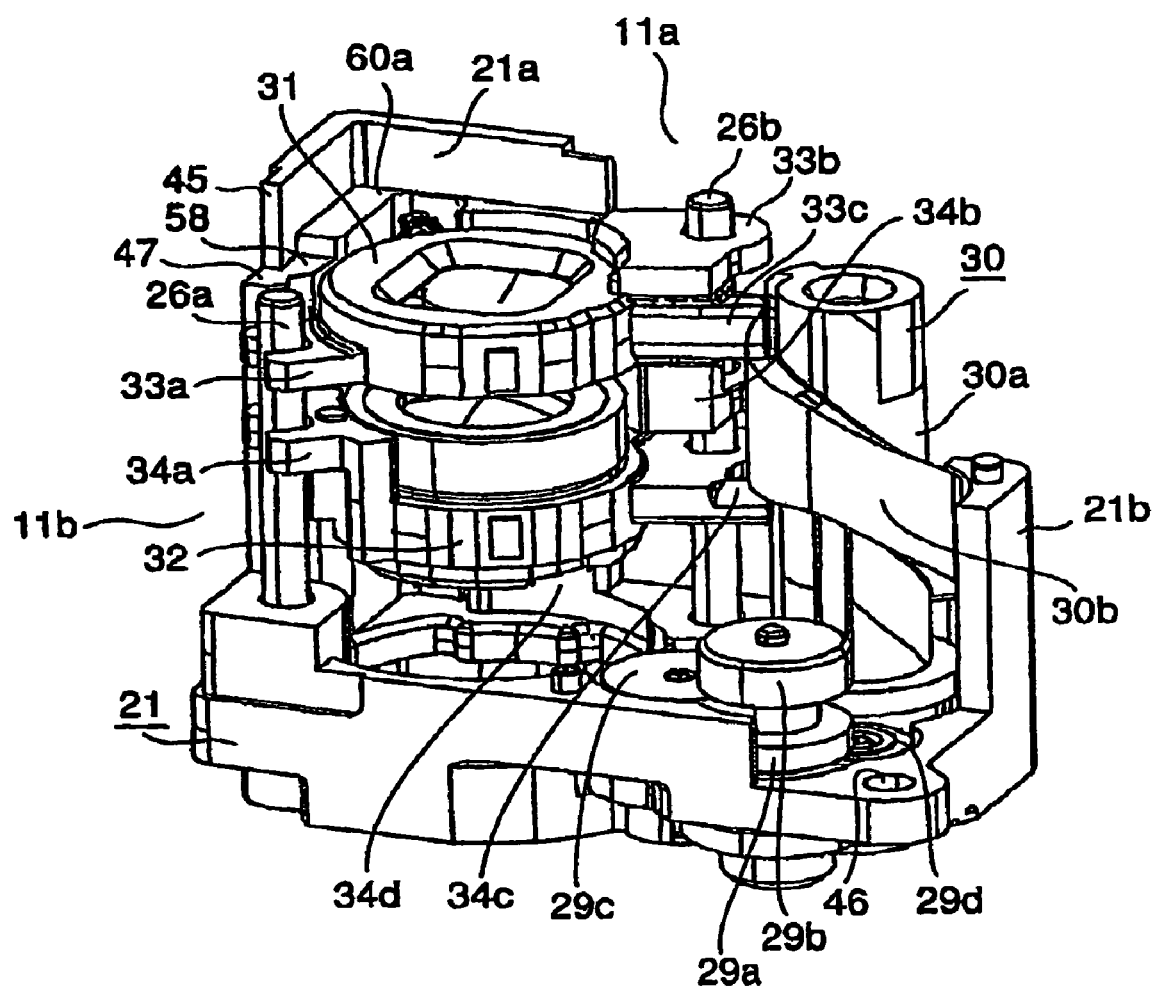
FIG. 8 is a perspective view showing when the moving lens assemblies and cylindrical cam of FIG. 7 are attached to the first housing.
Figure 9A:
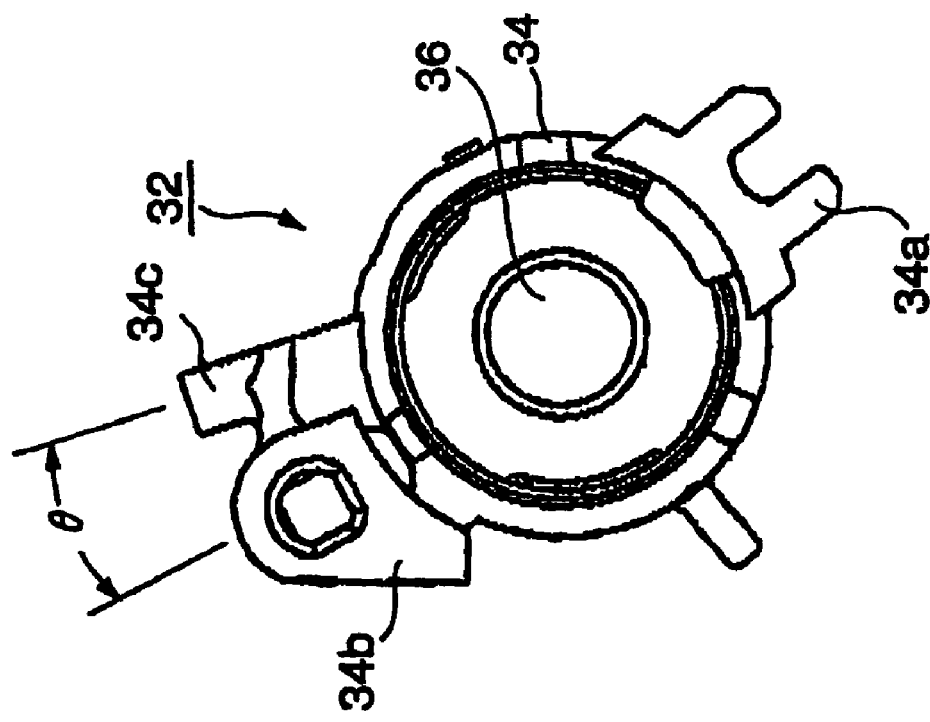
FIG. 9(A) is a top view of one of lens holders.
Figure 9B:
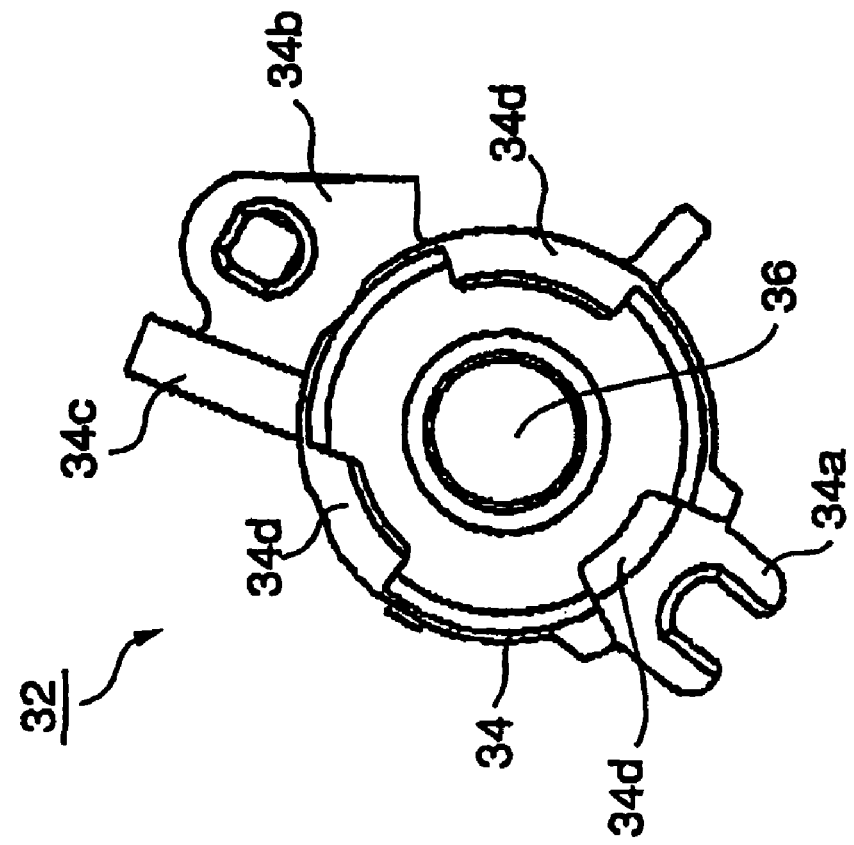
FIG. 9(B) is a bottom view of the lens holder.
Figure 10:
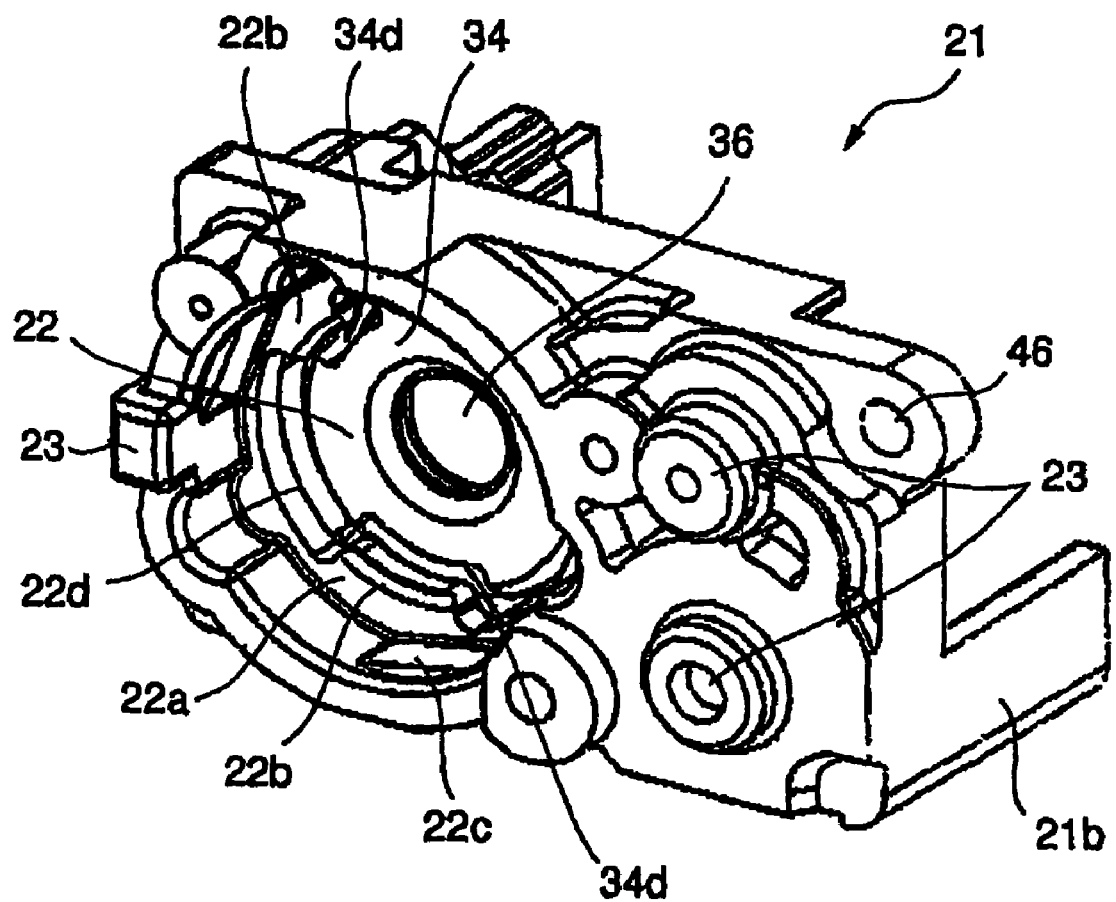
FIG. 10 is a perspective view showing the state when the lens holder of FIG. 9(A) is mounted to the first housing.
Figure 11:
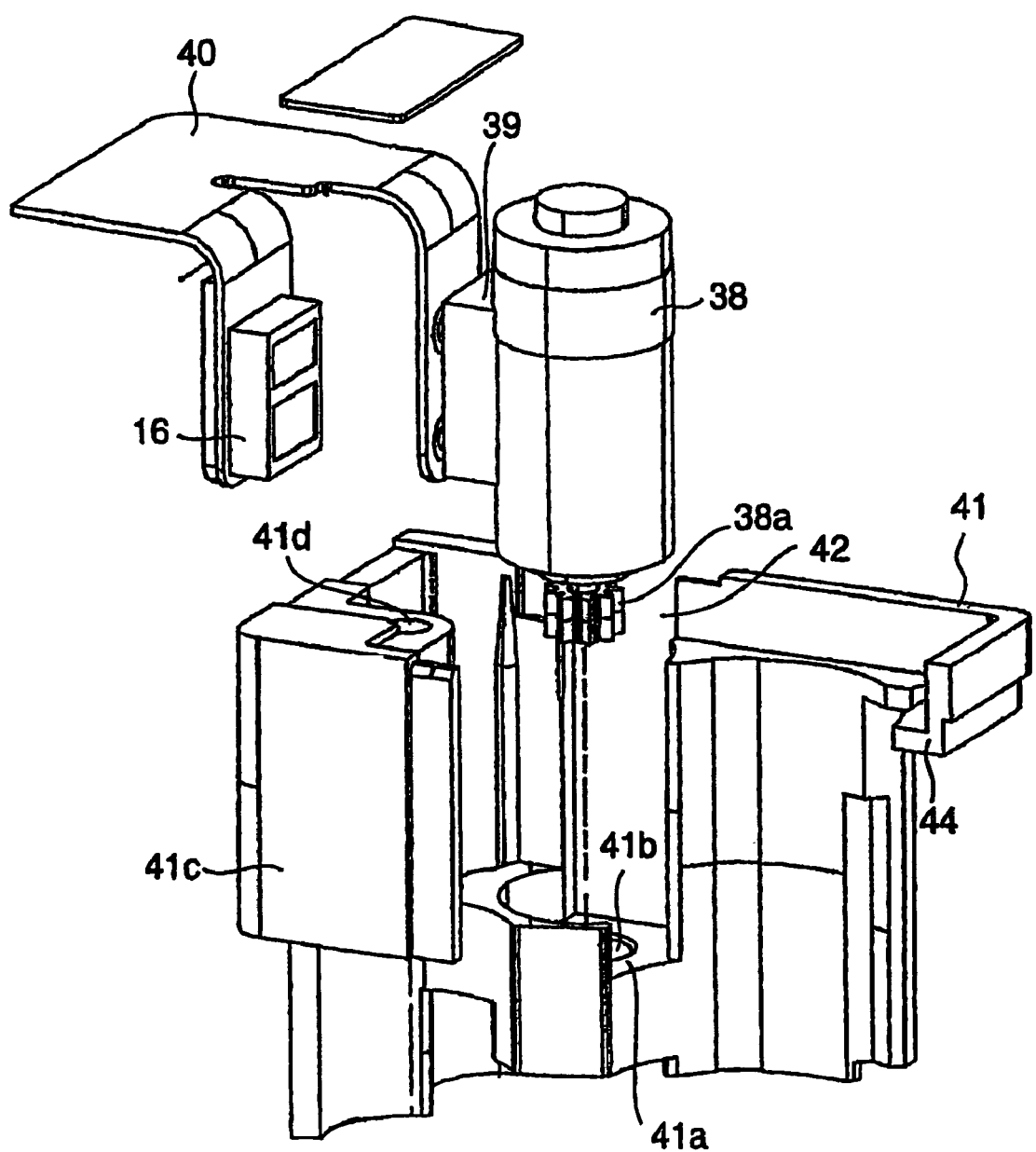
FIG. 11 is a perspective view of the second housing together with the drive motor to be fixed to the second housing and the flexible band attached with an optical sensor and attached to the drive motor.
Figure 12:
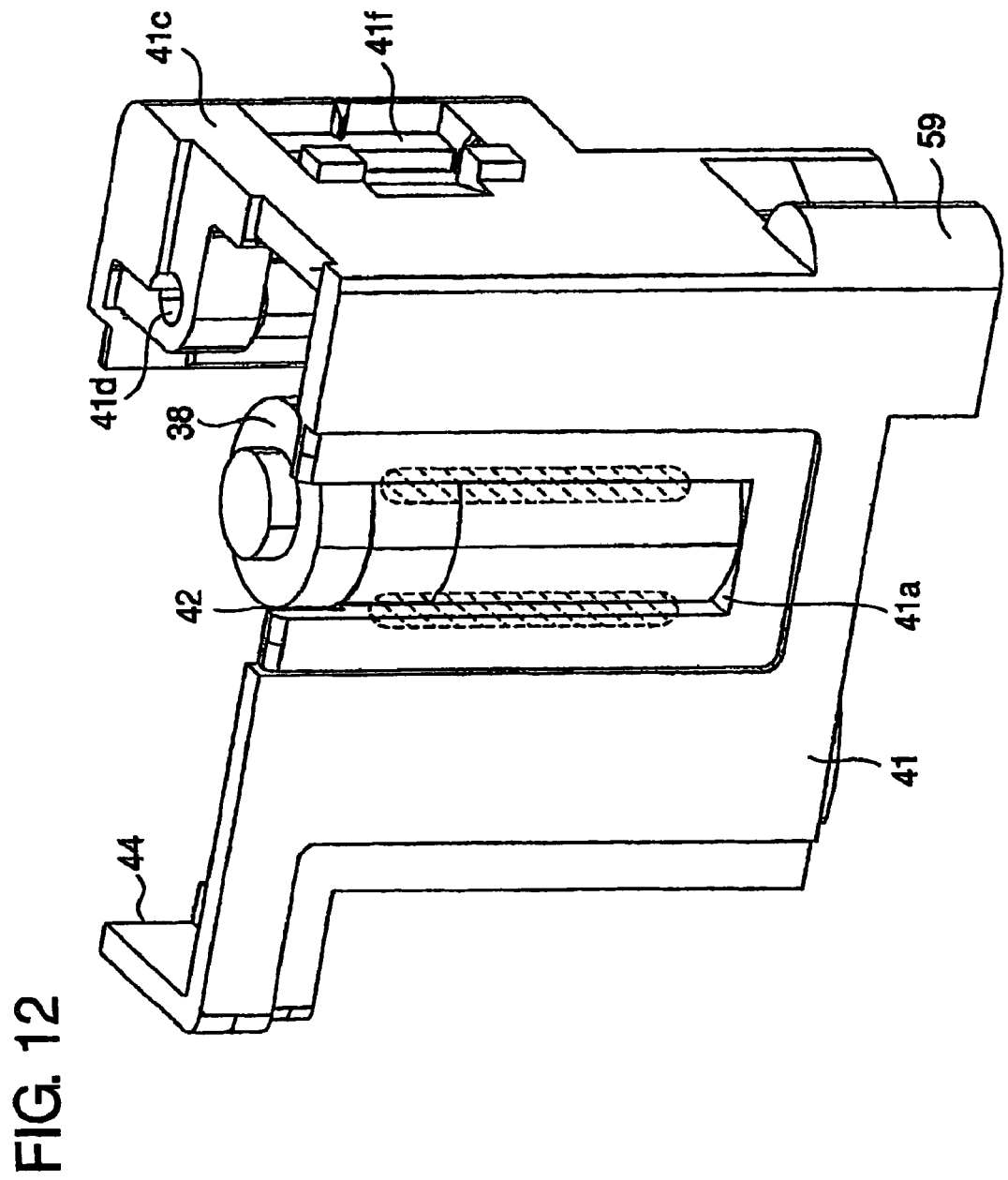
FIG. 12 is a perspective view of the second housing showing the state when the drive motor is fixed thereto facing to the cut-out opening part thereof.
Figure 13:
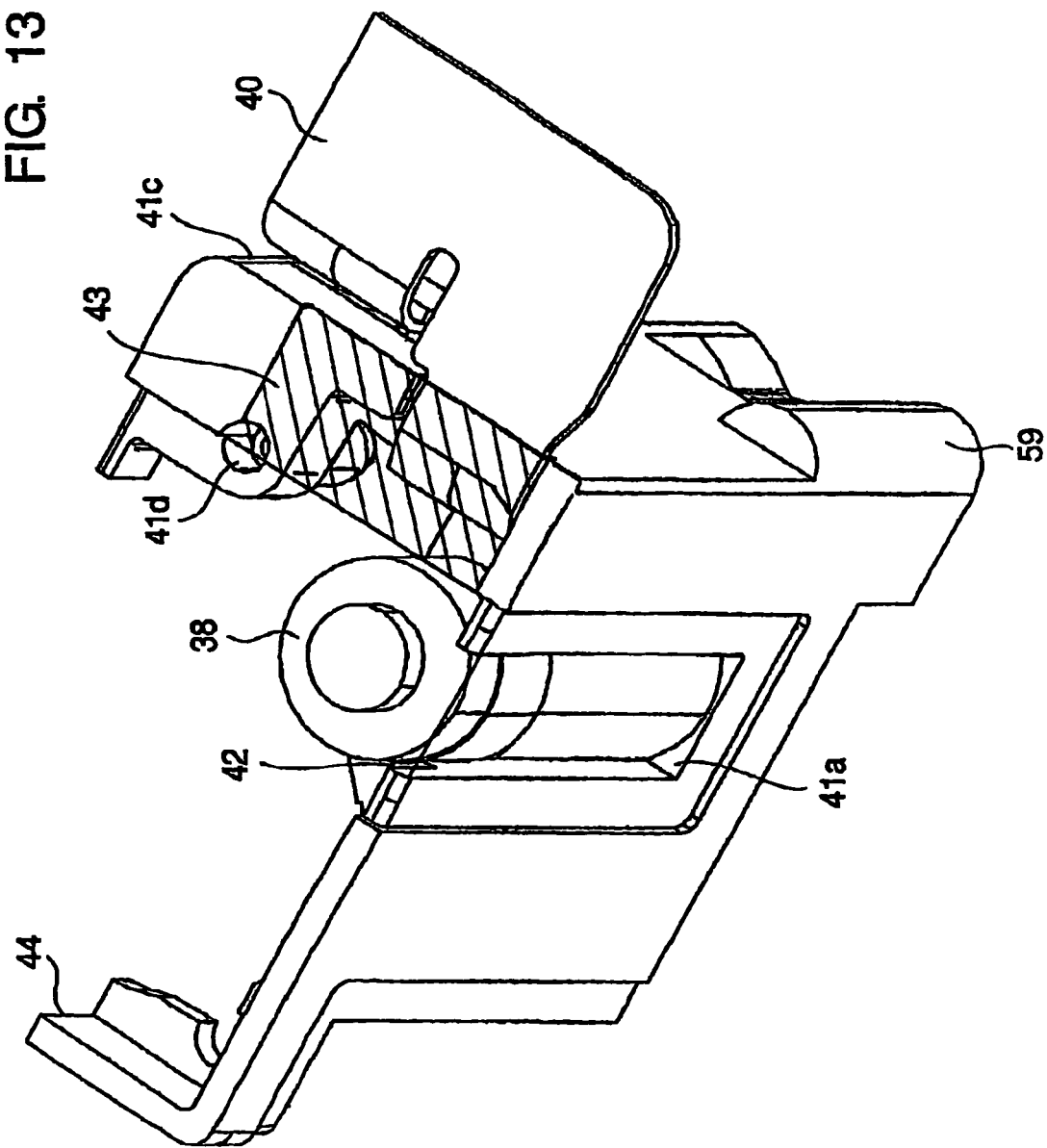
FIG. 13 is a perspective view of the second housing showing the state when the drive motor is fixed thereto facing to the cut-out opening part thereof together with the flexible band attached to the drive motor.
Figure 14:
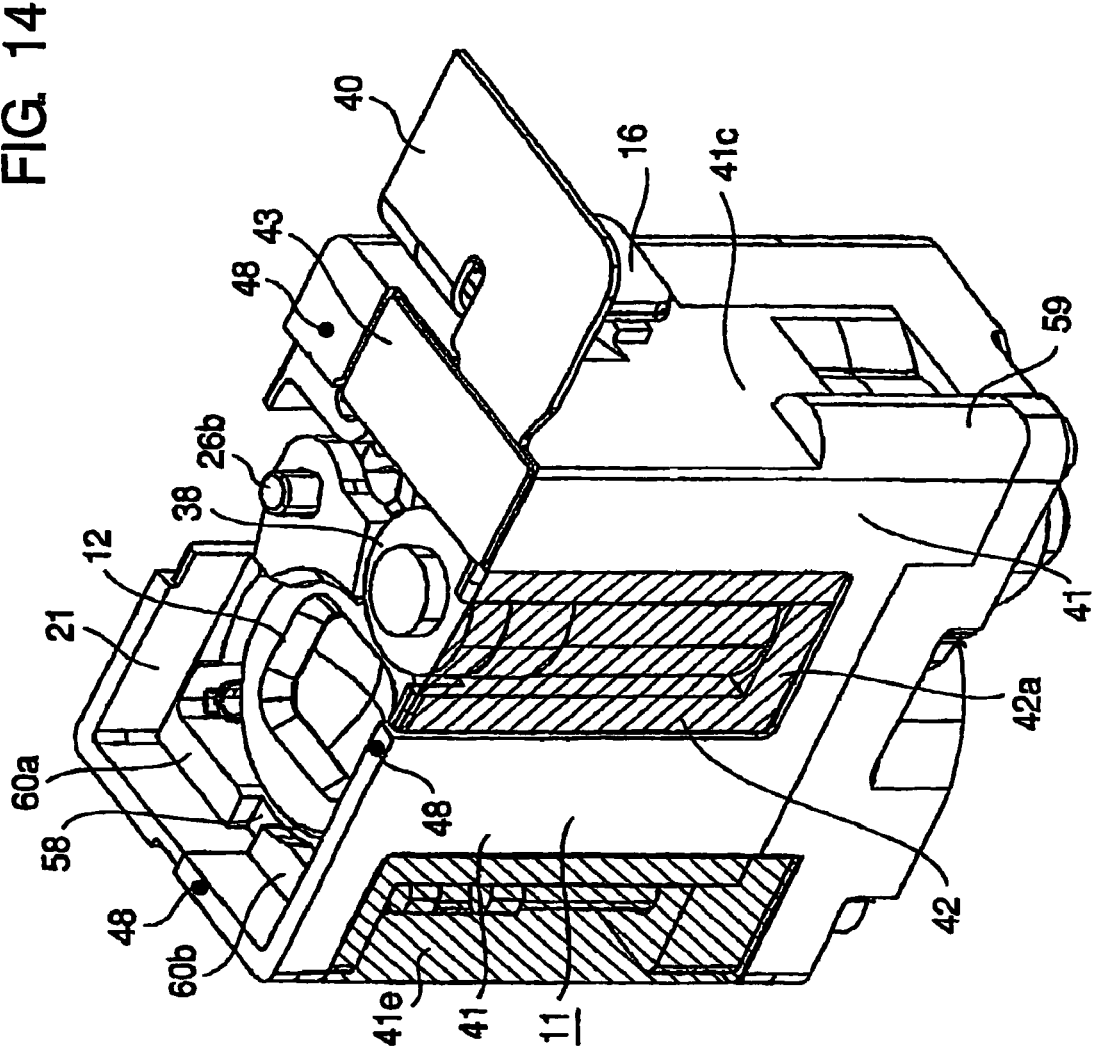
FIG. 14 is a perspective view of the camera module before the CCD is attached for explaining attaching thereof.
Figure 15:
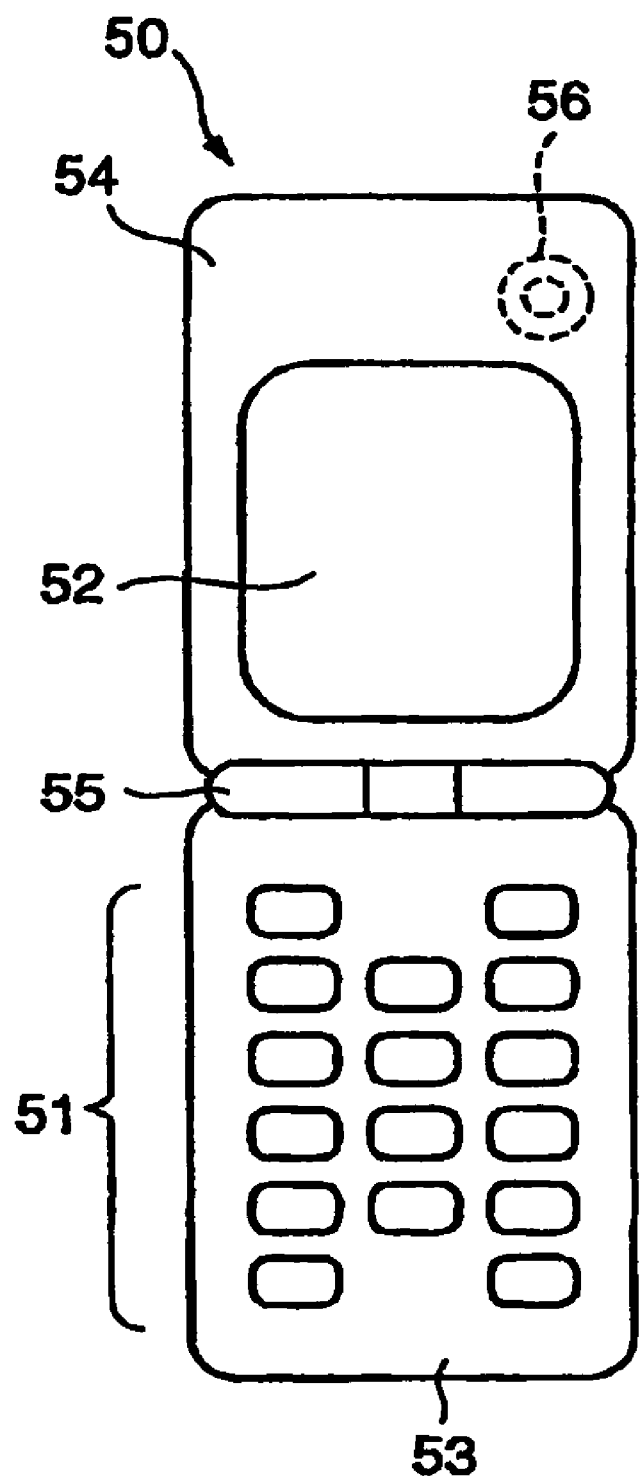
FIG. 15 is a schematic view of the portable terminal installed with the camera module according to the present invention.

FIG. 1 is a perspective view of an embodiment of the camera module according to the present invention, FIG. 2 is a perspective view of the first housing of the casing of the embodiment of the camera module according to the present invention, FIG. 3 is a plan view of the first housing of FIG. 2, FIG. 4 is a perspective view showing the state when guide shafts and gear shafts are being attached to the first housing of FIG. 2, FIG. 5 is a perspective view showing the state when gears are being fitted rotatably to the gear shafts shown in FIG. 4, FIG. 6 is a perspective view showing the state when gears have been fitted rotatably to the gear shafts shown in FIG. 4, FIG. 7 is a perspective view of moving the lens assemblies and cylindrical cam of the camera module according to the present invention, FIG. 8 is a perspective view showing when the moving lens assemblies and cylindrical cam of FIG. 7 are attached to the first housing, FIG. 9(A) is a top view of one of lens holders and FIG. 9(B) is a bottom view of the lens holder, FIG. 10 a perspective view showing the state when the lens holder of FIG. 9(A) is mounted to the first housing, FIG. 11 is a perspective view of the second housing together with the drive motor to be fixed to the second housing and the flexible band attached with a optical sensor and attached to the drive motor, FIG. 12 is a perspective view of the second housing showing the state when the drive motor is fixed thereto facing to the cut-out opening part thereof, FIG. 13 is a perspective view of the second housing showing the state when the drive motor is fixed thereto facing to the cut-out opening part thereof together with the flexible band attached to the drive motor, FIG. 14 is a perspective view of the camera module before the CCD is attached for explaining attaching thereof, and FIG. 15 is a schematic view of the portable terminal installed with the camera module according to the present invention.

In the drawings, the same component is indicated by the same reference number. Referring to FIG. 1, reference numeral 11 is a camera casing (hereafter referred to simply as casing) made of, for example, polycarbonate containing fluorine, the casing 11 consisting of a first housing 21 (see FIG. 2) and a second housing 41 (see FIG. 11, 12). Reference numeral 12 is an optical lens system, 13 is a lens moving mechanism, 11a is an opening part of the casing 11, a hatched part indicated by reference numeral 14 is a cover plate (light shielding plate) covering the opening part 11a. Reference numeral 15 is a CCD which is attached to the casing 11 at the lower side thereof in the drawing and by the light received through the optical lens system 12 is converted to an electric signal. Reference numeral 16 is an optical sensor (light emitting device and photoreceptor device) attached to the side of the casing 11. The optical sensor 16 detects the rotation position or rotation angle or rotated angles of the cylindrical cam and the distance of the position of the moving lens group or groups from a reference position is calculated. The optical sensor 16 is attached to a flexible band 40 (see FIG. 11) which also serves as a covering plate to cover an opening 41f provided on a side wall 41c of the second housing 41.

Referring to FIG. 2, FIG. 3, and FIG. 10, reference numeral 21 is the first housing of the casing 11. A first thick side wall part 21a and a second thick side wall part 21b extend from the upper part (base part) of the first housing 21. Cutout opening parts 11a and 11b are defined between the thick side wall parts 21a and 21b. Reference numeral 22 is an opening formed in the base part (upper part in FIG. 2 of the first housing) for retaining the object side fixed lens of the optical lens system (not shown in FIG. 2) of the camera module, 22a is an annular formation extending radially inwardly from the inside surface of the opening 22, and 22b's are reference surfaces on a plurality of protruded portions protruding radially inwardly of the annular formation 22a, in the embodiment three protrusions being formed. Reference numerals 22c's are salient parts for positioning the object side fixed lens so that its center coincides with the center line of the optical lens system, 22d's are concaved portions of the annular formation 22a to allow a lens holder 34 (see FIG. 7) to advance into the space surrounded with the annular formation 22a, and 23's are reference surfaces, which serve as reference surfaces when assembling, on a plurality of protrusions provided on the outer face of the base part of the first housing 21, in the embodiment three protrusions being formed.

In FIG. 4 is shown the first housing of FIG. 2 in an upside-down position. In the drawing, reference numeral 24 is a mounting portion provided near the opening 22 to mount a lens moving mechanism (not shown in FIG. 4) to be mounted to the base part of the first housing 21. On the mounting portion 24 are formed a cam mounting part 27 for mounting a cylindrical cam mentioned later and a shaft body 28 protruding upward near the cam mounting part 27. Reference numerals 25a and 25b are a first and a second hole for fixing a first and a second shaft (guide shafts) respectively, the holes 25a and 25b being provided on the base part near the peripheral part of the opening 22 with angular spacing of about 180° to each other. Reference numerals 25c and 25d are a third and a fourth hole for fixing a third shaft and a fourth shaft respectively. Reference numerals 26a, 26b, 26c, and 26d are a first, a second, a third, and a fourth shaft made of, for example, stainless steel. Among them, the first and second shaft 26a and 26b are guide shafts for guiding moving lens groups (not shown in FIG. 4) of the optical lens system and inserted into the first and second hole 25a and 25b respectively to be fixed there. The third and fourth shaft are inserted into the third and fourth hole 25a and 25b respectively to be fixed there. Reference numeral 46 is a bolt hole for a screw bolt (not shown in the drawing) to fasten the first housing 21 and the second housing 41 (see FIG. 11, 12).

Referring to FIG. 5, reference numerals 29a~29d are gears to be fitted rotatably to the third and fourth shaft 26c and 26d and to the shaft part 28 as indicated by arrows with broken lines. A first gear 29a is fitted rotatably to the third shaft 26c and then a second gear 29b is fitted rotatably to the same on the first gear 29a. A third gear 29c is fitted rotatably to the fourth shaft 26d and a fourth gear 29d is fitted rotatably to the shaft part 28. The second gear 29b meshes with the third gear 29c, the third gear 29c meshes with the first gear 29a, and the first gear 29a meshes with the fourth gear 29d (see FIG. 6). As mentioned later, the gear of a driving motor is allowed to mesh with the second gear 29b and the rotation driving force of the driving motor is transmitted to the cylindrical cam via the gears 29b, 29c, 29a, and 29d (See FIG. 8. In FIG. 6 and FIG. 8. The gear 29b is shown on the way of being fitted rotatably to the shaft 26c, the gear 29b will be pushed down until it meshes with the gear 29c.). Reference numeral 45 is a side end face of the side wall part 21a of the first housing 21, where a side end face 44 of the second housing 41 mentioned later is jointed, 47 is an adhesive-joining part for joining the first housing 21 with the second housing 41 with an adhesive agent, the joining part 47 being located at a corner opposing nearly diagonally to the bolt hole 46 of the first housing 21, 58 is a concave formed when the first housing 21 and second housing 41 are assemble and fixed to each other as shown in FIG. 14, the concave 58 serving as a well for retaining an adhesive agent for adhering a board mounted with the CCD 15.

FIG. 7, FIG. 8, and FIG. 9 show moving-lens assemblies and a cylindrical cam, the state they are assembled to the first housing, and a top and bottom view of a moving-lens holder respectively in a state the camera casing in FIG. 1, 2 is turned upside-down. In the drawings, reference numeral 30 is a cylindrical cam for driving a lens moving mechanism 13 assembled to the first housing 21. The cylindrical cam 30 has a cylindrical part 30a, a spiral formation 30b around the periphery, and a journal 30e at the lower end. On the spiral formation 30b are defined an upper spiral cam face 30c and a lower spiral cam face 30d. The upper spiral face 30c is a cam face for zoom focusing, and the lower spiral face 30d is a cam face for zooming. The journal 30e is inserted into a bearing bore provided in the cam mounting part 27 of the first housing 21. The cylindrical cam 30 is provided with a bearing hole in the upper end part thereof to receive a shaft part formed in the second housing 41 as explained later to support the upper side of the cylindrical cam 30 for rotation. On the cylindrical part 30a of the cylindrical cam 30 is defined a reference line extending in the vertical direction in FIG. 2, although not shown in FIG. 7, the reference line being different, for example, in color from the color of the peripheral surface of the cylindrical part 30a.

Reference numeral 31 and 32 are a first lens assembly and a second lens assembly respectively having moving lenses attached thereto, 33 and 34 are lens holders of the first and second lens assembly respectively. Reference numerals 33a and 33b's are supporting arms of the lens holder 33, the arms 33a and 33b's extending from the periphery of the lens holder 33 radially outwardly, and 33c is a cam follower arm to be brought into contact with the upper spiral cam face 30c, the cam follower arm 33c also extending from the periphery of the lens holder 33 radially outwardly. Reference numeral 34a and 34b's are supporting arms of the lens holder 34, the arms 34a and 34b's extending from the periphery of the lens holder 34 radially outwardly, and 34c is a cam follower arm to be brought into contact with the lower spiral cam face 30d, the cam follower arm 34c also extending from the periphery of the lens holder 34 radially outwardly. Reference numeral 34d's are depressions (second concave portions) formed on the periphery of the lower part of the lens holder 34, which can be recognized clearly in FIG. 9(A). By virtue of the depressions 34's, the lens holder 34 can be advanced near to the object side fixed lens without interfering with the protruded portions of the annular formation 22a in FIG. 2. Reference numeral 35 and 36 are moving lens groups retained by the lens holders 33 and 34 respectively, and 37 is a spring member connected to the lens holders 33 and 34 so that the holders pull one another.

Referring to FIG. 11, FIG. 12, and FIG. 13, reference numeral 38 is a driving motor (stepping motor, for example) composing the lens moving mechanism 13, and 38a is a gear attached to the motor shaft of the driving motor 38. The driving motor 38 is located above the third gear 29c with the gear 38a-side down in FIG. 11 so that the gear 38a meshes with the second gear 29b shown in FIG. 8. Reference numeral 39 is a boss provided on a peripheral part of the driving motor 38 for attaching one of branched parts of the flexible band 40. The optical sensor 16 is attached to the other of branched parts of the flexible band 40 to face to the cylindrical cam 30. The flexible band 40 is bent in the direction perpendicular to the optical axis to be extended outward of the second housing 41 to which the driving motor 38 is attached.

Reference numeral 41a is a supporting face for supporting an end of the driving motor 38 to define the vertical position thereof, and 41b is an opening at the supporting face 41a for inserting the gear 38a of the driving motor 38 which meshes with the third gear 29c. Reference numeral 41c is a side wall of the second housing 41. An overhanging section is formed at an upper corner of the side wall 41c, and a shaft part is formed to protrude downward from the overhanging section, reference numeral 41d indicating a lightening hole of the shaft part. The upper side of the cylindrical cam 30 is supported rotatably by this shaft part by fitting the bearing hole provided in the upper part thereof as mentioned before. Reference numeral 41f is an opening for allowing the optical sensor for detecting the reference line on the cylindrical cam to face the cylindrical cam 30, and 42 is a cutout opening part extending vertically on a side wall of the second housing 41 with the upper side thereof open (see FIG. 12, 13, and 14).

Further, the side wall of the second housing 41 is thin near the cutout opening part 42, and the width of the cutout opening part 42 is smaller the diameter of the driving motor 38. Further, the second housing 41 has cutout parts on its side in addition to the opening 41f and cutout opening part 42 to define cutout opening parts 11a and 11b when the second housing 41 is assembled to the first housing 21 as shown in FIG. 2. The depth of the second housing 41 in a plane perpendicular to the center axis of the lens holders 33 and 34 (optical axis) is about the same as the sum of the diameter of the cylindrical cam 30 and the diameter of the driving motor 38. A hatched part 43 in FIG. 13 is a cover plate to cover the portion the flexible band 40 is drawn out of the second housing 41. Reference numeral 44 is a side end face of the second housing 41 to be joined to the side end face 45 of the side wall part 21a of the first housing 21, and 59 is a boss for providing a screw hole corresponding to the bolt hole 46 of the first housing 21 to fix the first housing 21 to the second housing 41 by means of a screw bolt.

FIG. 14 shows a perspective view of the state the second housing is attached to the first housing and moving lens assemblies and driving motor 38 are assembled to the housings. In the drawing, a hatched part indicated by reference numeral 42a is a cover plate covering the cutout opening part 42 for light shielding, a hatched part indicated by reference numeral 42e is a cover plate covering the cutout opening part 11b for light shielding. Reference numeral 48's are reference points for measurement when the CCD 15 shown in FIG. 1 is fixed, and 60a and 60b are image pickup device attaching parts for bonding a board mounted with the CCD 15. Referring to FIG. 15, reference numeral 50 is a portable telephone as an example of portable terminal, 51 is an operating portion, 52 is a display made of liquid crystal for example, 53 is a first case part equipped with the operation portion 51, 54 is a second case part equipped with the display 52, 55 is a hinge mechanism, and 56 is a camera module.

The camera module according to the embodiment is constructed such that; the camera casing 11 is composed of the first housing 21 made of resin such as, for example, polycarbonate containing fluorine, which has increased durability and good sliding property, and the second housing 41; the first housing 21 is formed to be open in a direction (in the upward direction in FIGS. 4, 5, 6, 8) so that the lens assemblies 31, 32, guide shafts (the first and second shafts 26a and 26b) for guiding the lens holders 33, 34, gear shafts (the third and fourth shafts 26c and 26d) for fitting rotatably the gears 29a~29d, and the cylindrical cam 30 of the lens moving mechanism are assembled to the first housing from the opening side; and the second housing 41 with the motor 38 fixed thereto is joined to the first housing.

As the assembling is done in an automated procedure by bringing the reference surfaces 23's into contact with the reference surface of an assembly jig (not shown in the drawings), using the reference surfaces 23's as reference surfaces to secure accuracy in assembling and adjusting the lens assembly and lens moving mechanism, the camera module can be assembled extremely easily and the automatic assembly itself can be performed easily and simply.

The camera module of the embodiment is composed such that; the camera casing 11 is composed of the first housing 21 to which the optical lens system 12 and lens moving mechanism 13 are attached, and the second housing 41 to which the driving motor is bonded; the first housing is provided with a bolt attaching part 46 at a corner part and a bonding part 47 near a corner part opposing nearly diagonally to the bolt attaching part 46; and the first and second housing are joined and fixed at the bolt attaching part 46 and the bonding part 47, so that the bolt attaching part 46 is located at a part where it is suitable for the casing 11 to be formed thick and the bonding part 47 is positioned at a remotest part from the bolt attaching part 46 is not needed to be formed thick. Therefore, the housings can be fixed while preventing deviation of the housings relative to each other in rotational direction around the fixing part 46 to be fixed by the single bolt. Thus, a robust camera module can be provided which constructed to be small in size and light in weight even if autofocusing (AF) function and zooming function.

In the embodiment of the camera module of FIG. 1, the camera casing 11 (hereafter referred to as the casing) is made of, for example, resin such as polycarbonate containing fluorine to increase durability and improve sliding property, the casing being composed of the first housing 21 shown in FIG. 2 to which the lens moving mechanism 13 is mounted and the second housing 41 to which the motor 38 shown in FIG. 12 is attached; and the board mounted with the CCD 15 for picking up images, optical sensor 16 consisting of a light emitting device and a photoreceptor device, and cover plates (light shielding member) such as indicated by reference numerals 14, 41*e* are attached to the casing to compose the camera module to be small in size to be used as an image pickup device for the portable telephone 50 shown in FIG. 15 as an example of portable terminals Shooting and zooming operation of the camera module can be done by manipulating the operating portion 51 shown in FIG. 15.

FIG. 15 is a plan view of the portable telephone 50 shown in a state the operating portion 51 and display 52 are viewable (opened state); the first case 53 equipped with the operating portion 51 and the second case 54 mounted with the display 52 are connected with the hinge mechanism 55, and the first and second case 53, 54 can turn around the hinge mechanism 55.

The camera module is mounted to the second case 54 so that the optical lens system 12 is located at the position indicated by a double circle of broken line in the drawing, photographing is done by the camera module by manipulating a designated button on the operating portion 51, and the photographed image is displayed on the display 52. Therefore, the camera module is required to be composed very small in size. Zooming operation of the camera module can be possible by manipulating another designated button of the operating portion 51.

In the camera module of the embodiment, the first housing 21 is opened toward one side, the reference surface 22*b*'s for attaching the object side fixed lens of the optical lens system 12 and the reference surfaces 23's, which serve as reference surfaces when automatically assembling, are provided to the base part opposite to the open side, the reference surfaces 23's being defined taking the reference faces 22*b*'s as the basis for reference, and the lens assemblies 31, 32 and the lens moving mechanism comprising the cylindrical cam 30 and gears 29*a*~29*d* are from the open side. Therefore, moving lens groups and lens moving mechanism can be incorporated and adjusted with ease and automatic assembling with good accuracy can be made possible. Further, the first housing 21 can be removed from the mold in a direction with the accuracy of the reference surfaces side secured when casting.

On the inner surface of the opening 22 defined in the base part (upper part in FIG. 2) of the first housing 21 for attaching the object side fixed lens (not shown in FIG. 2) is formed the annular formation 22*a* extending radially inwardly. The inner surface of the annular formation 22*a* is formed such that a plurality of protrusions (on the surface of each of which is defined the reference surface 22*b*) and a plurality of concaved portions 22*d* exist alternately. The lens holder 34 is provided with depressions 34*d*'s so that the lens holder can advance into the space surrounded by the annular formation without interfering with the protrusions of the annular formation. On the inner surface of the opening 22 are provided salient parts 22*c*'s extending upward from the reference surfaces 22*d*'s. The position of the object side fixed lens in the direction of the optical axis is determined by the reference surfaces 22*b* and the central position thereof is determined by the salient parts 22*c* accurately.

The first housing 21 has a first side wall 21*a* partially thickened and a second thick side wall 21*b*. Between these side walls are cutout opening parts 11*a* and 11*b*. On the upper surface in FIG. 2 of the base part are formed a plurality (three in this case) of reference surfaces 23's protruding upward. These reference surfaces 23 are used as reference surfaces to be brought into contact with the reference surface of an assembly jig (not shown in the drawings) when the lens assemblies and lens moving mechanism are automatically assembled to the first housing 21 with the base-side down in order to secure accuracy in assembling and adjusting. Thus, the assembling becomes easy and automatic assembly itself can be performed very easily and simply.

The mounting portion 24 for mounting the lens moving mechanism (not shown in FIG. 4) is provided in the base part of the first housing 21 adjacent to the opening 22, and further the shaft mounting holes 25*a* and 25*b* for mounting the guide shafts 26*a* and 26*b* (the first and second shaft) respectively for guiding the lens holders 33 and 34 are provided in the base part at the peripheral part of the opening such that the shaft mounting holes 25*a* and 25*b* are positioned at about 180° spacing in the vicinity of both side-ends of the side wall 21*a*. The shaft mounting holes 25*c* and 25*d* are provided in the mounting portion 24 for mounting the shafts 26*c* and 26*d* (the third and fourth shaft) for fitting gears rotatably.

To each of the first to fourth holes 25*a*~25*d* are inserted the first~fourth shafts 26*a*~26*d* made of for example stainless steel from the upside in FIG. 4 of the first housing 21 as indicated by arrows with dotted lines. Near the mounting part 24 in the base part of the first housing are provided the cam mounting part 27 (cam bearing) for supporting the cylindrical cam 30 and the shaft body 28 protruding upward and formed in one piece with the housing. FIG. 5 shows the state the first to fourth shaft 26*a*~26*d* are mounted. As indicated by arrows with dotted lines in FIG. 5, the first gear 29*a* and second gear 29*b* are fitted to the third shaft 26*c*. To the fourth shaft 26*d* is fitted the third gear 29*c*, which meshes with the first gear 29*a*. To the shaft body 28 is fitted the last stage gear 29*d*, which meshes with the first gear and the gear of the cylindrical cam. FIG. 6 shows the state the gears 29*a* to 29*d* are assembled. Therefore, there is in the first housing only the cam bearing hole of the cam mounting part 27 as a sliding part.

By making the shaft 26*c* and 26*d* of metal, these shafts can be made small in diameter, for the rotation speeds of the gears fitted to the shafts are high but loads are small. As a result, the gears can be reduced in diameter, which effects to reduce the size of the camera module and suppress mechanical noise. The rotation speed of the last stage gear 29*d* is relatively slow and mechanical noise emitted is also low. As the shaft body 28 to which the last stage gear 29*d* is fitted is formed in one piece with the first housing and accordingly is made of resin, it is light even if its diameter is increased to secure strength. Although only the shaft for the last gear is made of resin here, the other shafts may be made of resin. By forming the shaft for the last stage gear in one piece with the housing, the number of constituent parts is reduced and assembling man-hours can be reduced.

The lens holders 33, 34 for retaining the moving lenses of the optical lens system 35, 36 are composed as shown in FIG. 7. FIG. 8, and FIG. 9. The lens holder 33 has a supporting arm 33*a* and a pair of supporting arms 33*b*'s, each being extending radially outwardly from the periphery thereof in directions substantially opposite to each other. Each of the supporting arms 33*b*'s is provided to be located apart to each other by a certain distance in the direction of the optical axis. The lens holder 34 has a supporting arm 34*a* and a pair of supporting arms 34*b*'s, each being extending radially outwardly from the periphery thereof in directions substantially opposite to each other. Each of the supporting arms 34b's is provided to be located apart to each other by a certain distance in the direction of the optical axis. Each of the lens holders 33 and 34 is provided with a cam follower arm 33c and 34c extending radially outwardly deviated by an angle θ (see FIG. 9(B)) from the direction of the pair of supporting arms 33b's and 34b's and adjacent to the pair of supporting arms 33b's and 34b's respectively, the cam follower arm 33c overlapping with the pair of supporting arms 33b's and the cam follower arm 34c overlapping with one of the supporting arms 34b's at least partially in the direction of the optical axis.

A guide groove is provided in each of the supporting arms 33a and 34a of the lens holders 33 and 34 for fitting slidably to the first shaft (guide shaft) 26a in FIG. 4, and a guide hole is provided in each of the supporting arms 33b's and 34b's for fitting slidably to the second shaft (guide shaft) 26b in FIG. 4. The supporting arms 33b's and 34b's of the lens holders 33 and 34 are formed such that the holders are fitted slidably to the second shaft 26b in a state that one of the supporting arms 33b's and one of the supporting arms 34b's cross each other in the direction of the optical axis, that is, the lower supporting arm of the lens holder 33 is positioned between the upper and lower supporting arms of the lens holder 34. With this composition, the supporting arms 33b's can be formed to be apart by an increased distance to each other and also the supporting arms 34b's can be formed to be apart by an increased distance to each other. Therefore, when forces for moving the lens holders 33 and 34 in the direction of the optical axis exert slantwise in relation to the optical axis on the lens holders 33 and 34 from the spiral cam faces 30c and 30d via the cam follower arms 33c and 34c, the lens holders 33 and 34 can be moved smoothly along the guide shaft 26b, for the tilting of the lens holders caused by the gap between the guide shaft 26b and the guide holes of the supporting arms 33b's and 34b's becomes small by virtue of the increased distance between each of the supporting arms 33b's and between each of the supporting arms 34b's.

The cylindrical cam 30 is a cam member of nearly cylindrical shape made of metal, resin, or resin containing fluorine and has the cylindrical part 30a and spiral formation 30b defined on the periphery of the cylindrical part 30a. On the spiral formation 30b are defined the zoom focusing face 30c on the upper side thereof in FIG. 7 and zooming face 30d on the lower side thereof in FIG. 7. In the case the cylindrical cam 30 is made of resin, it can be made to have lightweight, strength, and durability, and further in the case it is made of resin containing fluorine, the sliding property of the journal 30e can be improved. The optical lens system of the camera module of the embodiment is an example of a dual focus type, the zooming face 30d is defined such that the second lens assembly 32 for shifting focus point is moved by a predetermined distance by the rotation of the cylindrical cam and after that the lens assembly 32 is not moved by further rotation of the cylindrical cam 30. The zoom focusing face 30c is defined such that the first lens assembly 31 is moved for focusing by the rotation of the cylindrical cam 30 even after the second lens assembly 32 is stopped after it is moved by the predetermined distance.

When the cylindrical cam 30 and the first and second lens assemblies are assembled to the first housing 21, the lower end face of the cam follower arm 33c contacts the focusing face 30c and the upper end face of the cam follower arm 34c contacts the zooming face 30d. The lens holders 33, 34 are connected by means of the spring 37 to be pulling each other.

A reference line, although not shown in the drawings, extending in the axial direction of the cylindrical 30 is provided on the cylindrical part 30a thereof, the reference line being different, for example, in color from that of the cylindrical part 30a so that the line is detected by the optical sensor 16 shown in FIG. 16 detects the original position of the cylindrical cam 30.

As shown in FIG. 8, when the lens assemblies 31, 32 and cylindrical cam 30 are assembled to the first housing 21, the second lens assembly 32 and first lens assembly 31 are mounted from the upper side of the first housing 21 so that the supporting arm 34a and 33a are fitted slidably to the first shaft 26a and the supporting arms 34b's and 33b's are fitted slidably to the second shaft 26b in the state the upper arm of the arms 34b's is located between the arms 33b's, then the cylindrical cam is mounted from the upper side of the first housing through inserting the journal 30e of the cylindrical cam 30 into the bearing bore of the cam mounting part 27 (see FIG. 4) provided at a peripheral part of the base part of the first housing 21 so that the upper contact face of the cam follower arm 34c contacts the zooming face 30d and the lower contact face of the cam follower arm 33c contacts the zoom focusing face 30c. With this construction, the contact positions of the cam follower arms 33c and 34c with the zoom focusing face 30c and zooming face 30d of the spiral formation 30b move along the faces 30c and 30d respectively as the cylindrical cam rotates, and the first and second lens assemblies can be moved smoothly in the direction of the optical axis guided by the first and second shafts 26a and 26b.

As the lens holder 34 is provided with the depressions 34d's as shown in FIG. 9 and FIG. 10 so that it can advance into the space surrounded by the annular formation 22a without interfering with the protrusions (on which are defined the reference surfaces 22b's) of the annular formation 22a in the opening 22 shown in FIG. 3, the lens holder 34 can be moved near to the fixed lens retained in the opening 22. Therefore, a camera module can be provided which has zoom ratio large enough by securing enough moving distance of the lens holder 34. As the cutout opening part 11a is provided in the casing 11 as shown in FIG. 1, lens moving mechanism 13 such as lens holders 33, 34, and cylindrical cam 30 are accessible from outside before the opening part is covered, it is possible to perform visual inspection, a variety of adjustment, and accuracy confirmation of the optical lens system.

The driving motor (stepping motor, for example) 38 composing the lens moving mechanism 13 having the gear 38a attached to the motor shaft thereof is supported on the supporting face 41a of the second housing 41 with the gear-side down and the gear 38a inserted into the opening 41a as shown in FIG. 11. In this state, the gear 38a is located above the third gear 29c and meshes with the gear 29b shown in FIG. 8. Further, one of the branched parts of the flexible band 40 is attached to the boss 39 provided on a peripheral part of the driving motor 38, and the flexible band 40 is extended out of the second housing 41.

In one of the side wall 41c of the second housing 41 is defined the opening 41f, at which the other of the branched parts of the flexible band 40 mounted with the optical sensor 16 is attached. The optical sensor 16 detects the reference line on the cylindrical part 30a of the cylindrical cam 30 to determine the original position of the cylindrical cam 30 or rotation angle position or angles rotated. The flexible band having the optical sensor 16 mounted thereto serves also for covering the opening 41f. With the construction like this, the motor 38 is mounted at the opening 42 and the sensor 16 is mounted at the opening 41f without reducing the strength of the second housing, and a camera module can be constructed which is small in size, light in weight, and has enough strength, and a portable terminal equipped with the camera module can be provided.

The driving motor 38 is attached to the second housing 41 of the casing 11 as shown in FIG. 12. The cutout opening 42 is defined in a side wall of the second housing 41 to extend in the vertical direction to be upwardly open. Further, the side wall is thin near the cutout opening 42 of the second housing 41, and the width of the cutout opening is smaller than the diameter of the driving motor 38. The depth of the second housing in the plane perpendicular to the direction of the optical direction of the lens holders 33, 34 is about the same as the sum of the diameter of the cylindrical cam and the diameter of the driving motor 38. Therefore, the driving motor 38 and the cylindrical cam 30 can be located to be adjacent to each other in the direction of the depth.

In FIG. 12, 13, each of the inside surface of both sides of the vertically extending cutout opening 42 is formed into the surface of a segment of a cylinder so that the peripheral surface of the driving motor 38 contacts the surfaces of the cylindrical segments tight fittingly in the state the driving motor 38 is supported on the supporting face 41a. Therefore, by applying an adhesive agent to the surfaces of the cylindrical segments as shown by hatching in FIG. 12 and locating the driving motor 38, the same is adhered and fixed to the second housing 41 firmly. The flexible band 40 is drawn out of the second housing 41 from the upper part of the housing as shown in FIG. 13. The part where the flexible band 40 is drawn out is covered by the cover plate 43 indicated by hatching in FIG. 13. The cutout opening part 42 is covered by the light shielding cover plate 42a (see FIG. 14).

By fixing the driving motor in this way, the driving motor 38 is bonded and fixed to the surfaces of the cylindrical segment defined inside both sides of the vertically extending cutout opening part 42 tight fittingly with good accuracy. Therefore, the driving motor can be fixed easily and simply to the housing with good accuracy without necessity of using fastening screws or ring plate as has been the case with prior arts.

In the embodiment, as can be recognized from FIG. 14, the motor 38 and cylindrical cam 30 are located juxtaposed to each other and in the vicinity of the moving lens holders 33, 34 of the optical lens system 12 and the center axis of the cylindrical cam 30 is parallel to the optical axis of the lens system 12 as recognized from FIG. 14, so that the optical lens system 12, motor 38, and cylindrical cam can be incorporated with ease. In addition, as the depth of the second housing in the plane perpendicular to the direction of the optical direction of the lens holders 33, 34 is about the same as the sum of the diameter of the cylindrical cam and the diameter of the driving motor 38, a downsized camera module can be provided.

The first housing 21 mounted with the lens system and driving mechanism is joined to the second housing 41 to which the driving motor is fixed such that; a corner part of the base part of the first housing 21 where the bolt hole 46 is provided mates to the boss part 59 of the second housing 41, the lower end face of the side wall part 41c (see FIG. 11) of the second housing 41 mates to the upper end face of the side wall part 21b (see FIG. 5, 6, and 8) of the first housing 21, and the side end face 44 (see FIG. 11) of the second housing 41 mates to the side end face 45 (see FIG. 5, 6, and 8) of the first housing 21. That is, an adhesive agent is applied onto the adhesive-joining part 47 of the first housing 21, a bolt (not shown in the drawings) is let in through the bolt hole indicated by reference numeral 46 in FIG. 4, the side end face 44 (see FIG. 11) of the second housing 41 with the driving motor fixed thereto mates to the side end face 45 (see FIG. 5, 6, 8) of the first housing 21, and the second housing is fixed to the first housing with the bolt and the adhesive agent while preventing deviation of the housings relative to each other in rotational direction around the fixing part 46 to be fixed by the bolt.

When the first housing 21 and second housing 41 are joined together and fixed in this way, a board mounted with the CCD indicated by reference numeral 15 is adhered to the image pickup device attaching parts 60a and 60b of the first and second housing. The attaching of the board mounted with the CCD 15 is performed in such a way that; the board mounted with the CCD 15 is moved around 5 axes, taking for example three points indicated by reference numerals 48's as the basis for the movement while picking up an image sent through the optical lens system 12, a position of the board is detected with which the optical axis of the CCD 15 and that of the optical lens system 12 coincide and at the same time the image is optimally focused into the CCD 15, the board is retained in the position, and an adhesive agent is inpoured to the concave 58. In this way, the board mounted with the CCD 15 is bonded and fixed to the casing 11.

After the board mounted with the CCD 15 is fixed to the casing 11, the cover plate (light shielding member) indicated by reference numeral 14 in FIG. 1 is attached by means of an adhesive agent to the casing 11 to cover the cutout opening defined by the first housing 21 and second housing 41, and the cutout opening part indicated by reference numeral 42 at the attaching part of the driving motor 38 and other cutout opening parts are covered similarly with cover plates (light shielding members) to bring the camera module of the embodiment shown in FIG. 1 to completion.

Although the casing 11 of the camera module of the embodiment has the cutout opening parts 11a, 11b shown in FIG. 12, the opening 41f shown in FIG. 12, and the cutout opening part 42, all of the opening parts are covered with the cover plate 14 which covers the opening part 11a, with the flexible band mounted with the optical sensor 16 which covers the opening 41f, with the cover plate 41e which covers the opening part 11b, and with the cover plate 42a which covers the opening part 42. As the cover plate 14 covers the opening part between the first thick side wall part 21a and the second thick side wall part 21b, the cover plate 41e covers the opening part of the second housing 41 in the state the cover is bent at right angles to form a corner part, the opening 42 is relatively narrow in width, shut up by the motor 38 and covered with the cover plate 42a, and the opening 41f is relatively small and covered with the flexible band, the casing 11 is made strong enough by the presence of those covers. Further, as the cylindrical cam 30 and the lens moving mechanism including lens holders 33, 34, etc. can be accessed through the opening 11a before the cover plate 14 is attached, it is possible to perform visual inspection, a variety of adjustment, and accuracy confirmation of the optical lens system when assembling the camera module. Further, the sliding condition of the lens holders 33, 34 can be confirmed from the opening 11b, and the opening 42 is used for attaching the driving motor 38 as mentioned before. Thus, these opening parts are used effectively and serve to reduce the weight of the camera module.

In the camera module of the embodiment constructed like this, when the driving motor 38 shown in FIG. 11 rotates, the rotation force is transmitted from the gear 38 to the cylindrical cam via the gears 29a–29d shown in FIG. 8. The cam follower arms 33c and 34c of the first and second lens assembly 31 and 32 are moved in the direction of the optical axis by the rotation of the spiral formation 30b of the cylindrical cam 30, and zooming and focusing can be done smoothly as mentioned before. The original position of the cylindrical cam 30 can be determined through detecting the reference line on the cylindrical part 30a by the optical sensor 16, and focus distance and focus position can be obtained by counting the number of pulses given to the driving motor such as a pulse motor.

As has been described in the forgoing, according to the embodiment, the casing 11 is formed of resin such as polycarbonate containing fluorine; the casing 11 is composed of the first housing 21 to which the optical lens system 12 and lens moving mechanism 13 are mounted and the second housing 41 to which the driving motor is bonded; the board mounted with the image pickup device such as the CCD 15 being retained jointly by the first and second housing; the guide shafts and gear shafts (26a, 26b, 26c, and 26d), gears (29a, 29b, 29c, and 29d) attached to the shafts, cylindrical cam 30 are assembled from the open side of the first housing to be positioned therein, and the second housing having the motor bonded is joined to the first housing mounted with the optical lens system and lens moving mechanism; so that the assembling can be performed easily from the open side of the first housing 21.

In the camera module of the present invention, as the first supporting portion for positioning the guide shafts and the second supporting portion for positioning the shaft for fitting gears are provided on the base part opposite to the open side of the first housing 21, the shafts (26a, 26b, 26c, and 26d) can be easily positioned and fixed to the base part. Further, as bonding parts is provided on the inside surfaces of both fringe parts of the second cutout opening part 42, the motor 38 can be fixed easily and accurately to the second housing 41 by locating the same at the second positioning part provided on the inside surface of the second cutout opening part 42 with an adhesive agent applied to the bonding parts. Thus, motor 38 can be fixed to the second housing extremely easily.

Further, according to the present invention, as the width of the second cutout part 42 is smaller than the diameter of the motor 38 and the inside surfaces of both sides of the second cutout opening part 42 is formed to have the same shape as that of the periphery of the motor 38, the motor 38 can be fixed easily and accurately by an adhesive agent facing the second cutout opening part.

As both sides of the second cutout opening part 42 is formed to be thin and the light shielding member is attached to cover the cutout opening part, it is not needed to form a thick part in the side wall to attach a member for retaining the motor, and the camera module can be constructed small in size.

As the lens moving mechanism has the cylindrical cam 30 for moving the lens holder in a predetermine direction and the depth of the casing in a plane perpendicular to the optical axis of lens system is about the same as the sum of the diameter of the cylindrical cam 30 and the diameter of the driving motor 38, the camera module can be constructed small in size.

Further, according to the present invention, the reference surfaces for attaching the object side fixed lens and the reference surfaces for assembling the lens moving mechanism are provided to the base part of the first housing 21 to face to the same direction, and the moving lens assembly and lens moving mechanism can be assembled from the opposite side of the reference surfaces, the procedure of assembling the lens assembly and lens moving mechanism can be automated for easy and accurate automatic assembling. The first housing 21 can be removed from the mold in a direction with the accuracy of the reference surface side kept good.

The reference surfaces provided in the first housing 21 for attaching the fixed lens are defined on the annular formation protruding inwardly from the inner surface of the opening 22 of the first housing 21 for retaining the fixed lens, the annular formation having at least three protrusions protruding further inwardly and the references being defined on the surface of the protrusions, so that the fixed lens can be positioned accurately.

Further, the first housing is provided with a bolt attaching part 46 at a corner part and a bonding part 47 near a corner part opposing nearly diagonally to the bolt attaching part 46, and the first and second housing are joined and fixed at the bolt attaching part 46 and the bonding part 47, so that the bolt attaching part 46 is located at a part where it is suitable for the casing 11 to be formed thick and the bonding part 47 is positioned at a remotest part from the bolt attaching part 46 is not needed to be formed thick and downsizing of the camera module is possible. As the housings can be fixed while preventing deviation of the housings relative to each other in rotational direction around the fixing part 46 to be fixed by the single bolt, a robust camera module can be provided which constructed to be small in size and light in weight even if autofocusing (AF) function and zooming function are mounted.

Further, as the casing 11 of the camera module is made of resin containing fluorine, durability and sliding property are increased. So even if the shaft body and bearing-hole are formed in one piece with the casing, the gears and cylindrical cam can rotate smoothly and the durability of the shaft body and bearing hole is increased. Further, by adopting resin material containing fluorine not a simple resin for the casing, the casing can be increased in strength, as a result the casing can be formed thinner, and downsizing and weight saving of the camera module can be realized.

As has been described in the foregoing, according to the embodiment, a camera module having autofocusing and zooming functions and is most suitable to incorporate in a portable terminal, etc. can be provided, and a user-friendly portable terminal equipped with the camera module can be provided.

What is claimed is:

1. A camera module comprising:
   a first housing with at least one side opened,
   guide shafts and shafts possible to be inserted from said open side and the end of each of which is attached to a first positioning part of said first housing defined on the face opposite to said open side,
   gears possible to be fitted rotatably to said shafts,
   a cylindrical cam possible to be mounted to a first supporting part defined on the face opposite to said open side and driven via said gears,
   a motor for driving said cylindrical cam via said gears for focal and/or image magnification adjustment,
   moving lenses possible to be inserted from said open side and located to be moved along said guide shafts as said cylindrical cam is rotated, and
   a second housing possible to be joined to said first housing from said open side and having a second positioning part for retaining said motor defined therein.

2. The camera module according to claim 1, wherein said first supporting part for positioning said guide shafts and a second supporting part for positioning said shafts are defined on the face opposite to said open side.

3. The camera module according to claim 2, wherein said second housing has a second opening part formed to face the peripheral surface of said motor, and an adhesive agent exists on the inside surfaces of both fringe parts of said second opening part to fix said motor to said second housing when said motor is positioned at said second positioning part.

4. The camera module according to claim 3, wherein the width of said second opening part is smaller than the diameter of said motor, and said fringe parts of said second opening part where said motor contacts is shaped into the same shape as the peripheral surface of said motor.

5. The camera module according to claim 3, wherein said second housing has side wall parts of small thickness extending from both ends of said second opening part, and a light shielding member is positioned on said thin wall part and covers said second opening part.

6. The camera module according to claim 3, wherein the depth of the casing of the camera module consisting of said first and second housing in a plane perpendicular to the optical direction is about the same as the sum of the diameter of said cylindrical cam and the diameter of said motor.

7. The camera module according to claim 3, wherein
said first housing has reference surfaces for positioning and retaining the fixed lens of said optical lens system and reference surfaces for automatic assembling,
said guide shaft attaching part and said cylindrical cam bearing part are formed in one piece with said first housing, and
said reference surfaces for attaching said fixed lens and said reference surfaces for automatic assembling face to the same direction and said reference surfaces for assembling are located distantly from said reference surfaces for lens.

8. The camera module according to claim 1, wherein the camera module comprises:
a lens retaining part formed in one piece with said first housing for at least a lens of said optical lens system,
a mounting part formed in said second housing for mounting said image pickup device,
a bolt attaching part provided at a corner part of said first housing,
a bolt receiving part provided to said second housing for providing a screw hole to correspond to said bolt attaching part of said first housing,
a first joining part provided at the part nearly diagonally opposed to said bolt attaching part in relation to the center of said first housing,
a second joining part provided to said second housing to correspond to said first joining part of said first housing, and
concaved parts each provided proximate said first joining part and second joining part of said first housing and/or said second housing to form a well for retaining an adhesive agent.

9. The camera module according to claim 8, wherein said bolt holding part of said first housing is provided to a part suitable to be thickened, and said second joining part of said second housing is provided to a part formed thin.

10. The camera module according to claim 8, further comprising:
lens holder or holders for retaining moving lenses,
a cylindrical cam composing a lens moving mechanism for moving said lens holder or holders,
guide shafts for guiding said lens holder or holders, wherein said cylindrical cam, said guide shafts, said first and second joining parts are located in the vicinity of the periphery of said lens holder or holders.

11. The camera module according to claim 10, further comprising a driving source for driving the cylindrical cam located in the vicinity of said lens holder or holders, wherein said bolt attaching part is provided at a position proximate said driving source or said cylindrical cam and remote from said lens holder or holders.

12. The camera module according to claim 11, wherein said cylindrical cam and said guide shafts are located in the vicinity of the periphery of said lens holder or holders, said driving source to drive said cylindrical cam is located near the marginal part of said first housing, and gears are incorporated between said driving source and said cylindrical cam for transmitting the driving force of said driving source.

13. The camera module according to claim 8, wherein said first housing is formed to be open toward one side and has a thick side wall of lens retaining side and cutout opening parts, said second housing is formed such that the side wall provided with said bolt receiving part is thick and the side wall provided with said second joining part is thin, and said thick side wall part of said first housing and said thick wall part of said second housing are located such that they are positioned nearly diagonally opposite to each other.

14. The camera module according to claim 8, wherein a concaved part is provided at the first joining part of said first housing to form a well for retaining an adhesive agent to bond the board mounted with said image pickup device when the second joining part of said second housing is joined to said first joining part of said first housing.

15. A portable terminal comprising:
a camera module including;
a first housing at least one side is opened,
guide shafts and shafts possible to be inserted from said open side and the end of each of which is attached to a first positioning part of said first housing defined on the face opposite to said open side,
gears possible to be fitted rotatably to said shafts,
a cylindrical cam possible to be mounted to a first supporting part defined on the face opposite to said open side and driven via said gears,
a motor for driving said cylindrical cam via said gears for focal and/or image magnification adjustment,
moving lenses possible to be inserted from said open side and located to be moved along said guide shafts as said cylindrical cam is rotated,
a second housing possible to be joined to said first housing from said open side and having a second positioning part for retaining said motor defined therein;
a case body equipped with said camera module; and
an operation portion provided to said case body for driving said optical lens system of said camera module.

* * * * *